(12) United States Patent
Wang

(10) Patent No.: US 11,692,706 B2
(45) Date of Patent: Jul. 4, 2023

(54) THERMAL CRACKING SYSTEM

(71) Applicant: Hsiao-Nan Wang, Keelung (TW)

(72) Inventor: Hsiao-Nan Wang, Keelung (TW)

( * ) Notice: Subject to any disclaimer, the term of this patent is extended or adjusted under 35 U.S.C. 154(b) by 638 days.

(21) Appl. No.: 16/067,859

(22) PCT Filed: Jan. 6, 2017

(86) PCT No.: PCT/CN2017/070413
§ 371 (c)(1),
(2) Date: Apr. 24, 2020

(87) PCT Pub. No.: WO2017/118408
PCT Pub. Date: Jul. 13, 2017

(65) Prior Publication Data
US 2020/0248901 A1    Aug. 6, 2020

Related U.S. Application Data

(60) Provisional application No. 62/275,420, filed on Jan. 6, 2016.

(51) Int. Cl.
*F23G 5/44*       (2006.01)
*F23G 5/027*      (2006.01)
(Continued)

(52) U.S. Cl.
CPC .............. *F23G 5/444* (2013.01); *B01J 8/001* (2013.01); *B01J 8/025* (2013.01); *B01J 8/0278* (2013.01);
(Continued)

(58) Field of Classification Search
None
See application file for complete search history.

(56) References Cited

U.S. PATENT DOCUMENTS

| | | | |
|---|---|---|---|
| 5,198,018 A * | 3/1993 | Agarwal | B29B 17/02 75/401 |
| 8,137,508 B2 * | 3/2012 | Grispin | C10B 1/08 201/25 |

(Continued)

FOREIGN PATENT DOCUMENTS

| | | |
|---|---|---|
| CN | 2172769 Y | 7/1994 |
| CN | 101837978 | 9/2010 |

(Continued)

OTHER PUBLICATIONS

English Translation of CN2172769Y.*

*Primary Examiner* — Jason Lau
(74) *Attorney, Agent, or Firm* — WPAT, PC

(57) ABSTRACT

The invention provides a thermal cracking system which comprises a reactor, and a feed module or a solid product discharge module. The feed module transports a feed material from the outside environment to the reactor. While being transported, the feed material is heated by the feed module to become molten and fills up the interior of the feed module, thereby preventing air from entering the reactor. The solid product discharge module transports a solid product from the reactor to the outside environment. One end of the solid product discharge module is connected with the reactor. The other end of the solid product discharge module comprises a first opening interfacing with the outside environment. When the solid product is transported to the outside environment, the opening size of the first opening is selected such that the speed at which the solid product is entering the solid product discharge module form the reactor is equal to or greater than that at which the solid product is leaving the solid product discharge module, through the first opening, and into the outside environment. Benefit of the invention (Continued)

includes a higher production efficiency and enhanced safety for a thermal cracking system at industrial scale.

20 Claims, 59 Drawing Sheets

(51) Int. Cl.
| | | |
|---|---|---|
| *B01J 8/00* | (2006.01) | |
| *B01J 8/02* | (2006.01) | |
| *C01B 3/38* | (2006.01) | |
| *C10G 1/00* | (2006.01) | |
| *C10G 1/10* | (2006.01) | |
| *C10G 5/06* | (2006.01) | |
| *B01J 8/10* | (2006.01) | |
| *F23G 5/033* | (2006.01) | |
| *F23G 5/46* | (2006.01) | |
| *F23G 5/50* | (2006.01) | |

(52) U.S. Cl.
CPC ............... *B01J 8/10* (2013.01); *C01B 3/38* (2013.01); *C10G 1/002* (2013.01); *C10G 1/10* (2013.01); *C10G 5/06* (2013.01); *F23G 5/027* (2013.01); *B01J 2208/00539* (2013.01); *B01J 2208/00884* (2013.01); *B01J 2219/246* (2013.01); *B01J 2219/2444* (2013.01); *C01B 2203/0227* (2013.01); *C01B 2203/1235* (2013.01); *C10G 2300/1003* (2013.01); *C10G 2300/1007* (2013.01); *F23G 5/033* (2013.01); *F23G 5/46* (2013.01); *F23G 5/50* (2013.01); *F23G 2205/121* (2013.01)

(56) References Cited

U.S. PATENT DOCUMENTS

2014/0348710 A1\* 11/2014 Miller ............... C10K 1/10
422/108
2015/0080624 A1\* 3/2015 Gephart ............... C10G 1/02
585/241

FOREIGN PATENT DOCUMENTS

| CN | 103242883 A | 8/2013 | |
|---|---|---|---|
| CN | 203360385 U | 12/2013 | |
| WO | WO-2011014902 A1 \* | 2/2011 | ............ B29B 17/04 |

\* cited by examiner

The solid product transport device 3051 starts up, switch 6021 (i.e. inlet valve Vin) opens, the vacuum means 6041 starts up, and switch 6031 (i.e. outlet valve Vout) closes. The solid product starts entering the post-reactor vacuum zone 601 (i.e. th solid product vessel 3053) and towards the switch 6031 with the aid of the solid product transport device 3051. The gas product entering the post-reactor vacuum zone 601 alongside the solid product is extracted out of the post-reactor vacuum zone 601 through the vacuum points 604 by the vacuum means 6041. ⏤ 910

The solid product continues to enter the post-reactor vacuum zone 601, and starts accumulating inside the post-reactor vacuum zone 601 at the switch 6031. When the amount of accumulated solid product reaches a predetermined threshold value, the switch 6031 opens to allow the solid product to be transported out of the post-reactor vacuum zone 601 and to the outside environment 3001. The switch 6021 and 6031 are in communication to ensure the speed at which the solid product is entering the post-reactor vacuum zone 601 is equal to or greater than that at which the solid product is leaving the post-reactor vacuum zone 601, so that the switch 6031 stays submerged by the accumulated solid product. ⏤ 920

When discharge of solid product needs to stop, for example due to emergency situation or maintenance downtime, the switch 6021 closes, the solid product transport device 3051 and the vacuum means 6041 remains functioning, and the switch 6031 remains open. The solid product continues to be moved out of the post-reactor vacuum zone 601 till the post-reactor vacuum zone 601 is empty or the root of downtime is resolved. ⏤ 930

Fig. 8B

THERMAL CRACKING SYSTEM

RELATED APPLICATIONS

This application is a national stage filing under section 371 of International Application No. PCT/CN2017/070413 filed on Jan. 6, 2017, which claims priority to U.S. provisional application No. 62/275,420 filed on Jan. 6, 2016, which are hereby incorporated by reference herein in their entirety.

BACKGROUND OF THE INVENTION

Technical Field

The present invention relates to a thermal cracking system. More particularly, the present invention relates to a thermal cracking system allowing for continuous vacuuming in the feed and discharge process.

Description of Related Art

Among all the wastes, the solid waste is the most difficult to deal with. Alternative to incineration or landfilling, thermal cracking provides a more environmentally friendly way of disposal of solid wastes. Moreover, the process produces valuable commodities from the waste, including combustible liquid fuel as a liquid product, combustible gas as a gaseous product, and carbon black as a solid product.

Continuous feed is a required basis upon which industrial production can be realized. For a thermal cracking process, feeding the waste material in a continuous manner means the feed material is entering the reactor from the outside environment while the reaction is on-going. As a result, air from the outside environment may be carried into the reactor along with the feed material. Due to the fact that the thermal cracking process needs to be performed in an anaerobic environment, how to maintain air tightness of the reactor while continuously feeding the waste material into the reactor remains a bottleneck in the scale-up of a thermal cracking process. Pros and cons of prior art thermal cracking system operated in batch and continuous mode are concluded in Table 1 and Table 2, respectively.

TABLE 1

Comparison of thermal cracking system with different feed modes

| Feed mode | Advantage | Drawback |
| --- | --- | --- |
| Batch feed | Airtight reactor | Low production efficiency: reactor must be cooled off before being reloaded |
| Continuous feed | High production efficiency | Poor reactor airtightness |

TABLE 2

Comparison of thermal cracking system with different discharge modes

| Discharge mode | Advantage | Drawback |
| --- | --- | --- |
| Batch discharge | Airtight reactor | a. Low production efficiency: Intermittent production as reaction must be stopped for a full solid product vessel to be emptied out. |

TABLE 2-continued

Comparison of thermal cracking system with different discharge modes

| Discharge mode | Advantage | Drawback |
| --- | --- | --- |
| | | b. High cost: Large solid product vessel is often used to reduce reaction downtime frequency, resulting in higher capital costs. |
| Continuous discharge | High production efficiency | Poor reactor airtightness |

In prior art thermal cracking system, the feed material (waste) is shredded and then transported into the reactor by an airtight conveyor, such as an auger conveyor. If continuous feed is to be performed, one end of the conveyor must be made open to the open air (i.e. outside environment where the feed material is sit) and the other end open to the interior of the reactor. This brings a risk of breach of air tightness of the system which could result in dangerous explosion.

Various methods have been tried for keeping the thermal cracking system airtight in continuous feed mode, but none has been able to be developed to operate on a commercial scale.

Continuous feed allows greater production efficiency which can boost the economic feasibility of thermal cracking-based waste processing. Therefore, solutions to realize continuous feed while still maintain air tightness of the system are eagerly sought by the industry.

The same problem is facing continuous discharge of a thermal cracking process. When the system is operated in continuous discharge mode, the solid product vessel must remain open towards both the reactor and the open air so the solid product of the reaction can be continuously transported out of the reactor and into the outside environment. As a result, the same risk of breach of air tightness is present. Therefore, solutions to realize continuous discharge while still maintain air tightness of the system are eagerly sought by the industry.

SUMMARY

The present invention provides a thermal cracking system allowing for continuous vacuuming in the feed as well as discharge process. The feed material passes through a vacuum zone before entering the reactor. Outside air that comes in along with the feed material is removed in the vacuum zone, leaving the feed material behind to continue to move towards the reactor. The vacuum zone is a 3-D space in which air is mechanically extracted out in a continuous manner. In other words, it is a mechanically created, substantially vacuumed space. The vacuum zone can be a physical chamber constructed intentionally, or a virtual space formed inside the material passage, for example by exploiting the locally available hardware. The feed material is transported, in a continuous manner, through the vacuum zone where it is deprived of the accompanying air, and then towards the reactor. As a result, continuous feed can be carried out with confidence that the reactor is substantially airtight. Benefits of the invention include lower capital as well as operational cost, higher production efficiency, and enhanced safety.

In one aspect of the invention, a thermal cracking system is provided which comprises a reactor, a feed module, and a heating device. The feed module is used for transporting the feed material from the outside environment into the reactor. The heating device is used for heating the feed material while it is being transported by the feed module. The feed module and the heating device are configured such that the feed material becomes molten before it reaches the reactor, and that the molten material fills the interior of the material passage of the feed module, thereby forming a blockage inside the material passage, preventing air from reaching the reactor.

In another aspect of the invention, a thermal cracking system is provided which comprises a reactor and a solid product discharge module. The solid product discharge module is used for transporting the solid product of the thermal cracking reaction from the reactor to the outside environment. One end of the solid product discharge module is connected to the reactor for receiving solid product from the reactor, the other end of the solid product discharge module has a first opening interfacing with the outside environment. The opening size of the first opening is in relation to that of the reactor-connecting end such that the speed at which the solid product is entering the solid product discharge module is equal to or greater than that at which the solid product is leaving the solid product discharge module.

BRIEF DESCRIPTION OF DRAWINGS

The invention can be more fully understood by reading the following detailed description of the embodiment, with reference made to the accompanying drawings as follows.

FIG. 5I is a schematic diagram of a thermal cracking system according to yet another embodiment of the invention.

FIG. 8B is a flowchart illustrating operation of the post-reactor vacuum zone of FIG. 8A.

DETAILED DESCRIPTION

Figure 1:
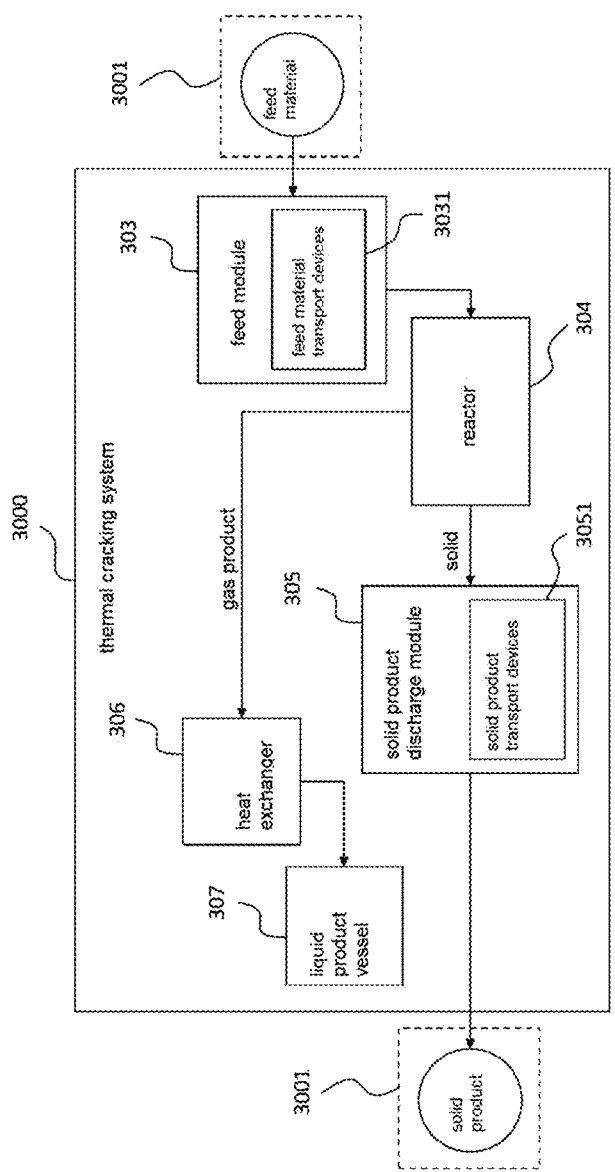
FIG. 1 is a block diagram of a prior art thermal cracking system.

The technical means adopted in the present invention for achieving intended purposes of the invention are further described below with accompanying drawings and specific embodiments. Those skilled in the related art can understand that the directional terms provided in the specific embodiments, such as up, down, left, right, front, or back etc., are used for elaboration with reference to the directions of the drawings only, but are not intended to limit the present invention. In addition, many variations and modifications can be made by those skilled in the related art without departing from the spirit and scope of the invention, and the practical examples derived therefrom are also within the scope of the invention. Moreover, in the following description, the term "substantially vacuumed" is used to refer to the condition of oxygen concentration being insufficient to cause combustion of the combustible gas product of the thermal cracking reaction.

The inventor has observed that, the vacuum mechanism tried in the prior art thermal cracking systems has been unsuccessful because it typically extracts air only up to within the immediate vicinity of the surface of the waste material stream. The air molecules present in the gaps and tiny pores deep inside the stream is difficult to be extracted in a real-time manner as the stream is constantly moving forward, because they need a longer time to diffuse through the tortuous paths between numerous pieces of solid to reach the surface of the stream and get removed by the vacuum mechanism. Employing more powerful vacuum seems like an obvious solution, but most of the time the solid pieces or chunks get sucked into the vacuum points easily and block them, causing the vacuum mechanism to fail.

Based on these observations, thermal cracking systems embodying the principles of the invention heat up the feed material(waste) into a molten material, such that pores among individual pieces of solid are closed as the molten solid gradually join together. As a result, gas molecules inside the pores are forced to agglomerate and become larger bubbles which is easier to remove from the surface of the feed material stream by the vacuum mechanism.

In the invention, a molten wasted material refers to waste material which is reduced to liquid form by heating. For this purpose, in an embodiment of the invention, the feed material is selected to be thermosoftening polymers, such as thermoplastics, rubbers, or combinations thereof.

In an embodiment of the invention, the molten feed material fills up the interior of the material passage of the feed module, forming a plug that covers the entire cross section of the passage which prevents incoming air molecule from further advancing towards the reactor. As a result, the molten feed material itself serves as a closed airtight valve. The benefits of such arrangement include that it reduces the burden of installing extra hardware to the system by exploiting material locally available.

In an embodiment of the invention, to render effective air removal, the feed module is divided into a transporting portion and a non-transporting portion. The interior of the transporting and non-transporting portion is connected to each other. The transporting portion comprises a material passage for accommodating the moving feed material, and a feed material transport device is provided in the material passage for forcing the feed material to move towards a specific direction. The non-transporting portion comprises a hollow chamber for air molecules to flow in, and one or multiple vacuum points are set in the chamber for extracting gaseous molecules therefrom. The feed material transport device is configured such that the feed material moves along the transporting portion and does not enter the non-transporting portion. Air, on the other hand, will spontaneously flow into the non-transporting portion and gets extracted therein. As the feed material is forced to avoid the non-transporting portion, more powerful vacuum means can be employed without worrying about sucking in the feed material.

In summary, of the above two embodiments of the invention, the former creates an airtight valve out of the feed material itself, and the later creates a vacuum zone adjacent to the passage of the moving feed material where air can be effectively extracted in a real-time manner. Both embodiments provide effective mechanism to stop the incoming airflow somewhere in the middle of the feed material passage, allowing only the feed material to continue to move towards the reactor, thereby forming the basis upon which continuous feed can be practiced. How the invention is advantageous over the prior art thermal cracking systems is summarized as below.

TABLE 3

| Problems in prior art | Solutions by the invention |
| --- | --- |
| Low production efficiency Poor reactor air tightness | Employing continuous feed Incoming air is continuously removed from the vacuum zone, only feed material moves on towards reactor |

Reference is now made to FIG. 1, which is a block diagram of a prior art thermal cracking system 3000. The right hand side of FIG. 1 corresponds to the upstream end of material flow in the thermal cracking system 3000, and the left hand side of FIG. 1 corresponds to the downstream end of material flow in the thermal cracking system 3000. First, the feed material enters a feed module 303 from the outside environment 3001. Then, the feed module 303 transports the feed material to a reactor 304 where the thermal cracking reaction takes place. When the reaction comes to an end, a solid product is transported to the outside environment 3001 by means of a solid product discharge module 305. A gas product leaves the reactor 304 for a heat exchanger 306 and gets condensed therein into a liquid fuel which is collected in a liquid product vessel 307.

The feed module 303 may comprise pipes, containers, one or multiple feed material transport devices 3031, or combinations thereof. The feed material transport device 3031 may be a conveyor belt, an auger conveyor, gravity, blower, or combinations thereof. To carry out continuous feed operation, the waste material is typically shredded so it is easier to transport. For example, typical shred size for an auger conveyor is equal to or less 50 mm.

The solid product discharge module 305 may comprise pipes, containers, one or multiple solid product transport devices 3051, or combinations thereof. The solid product transport devices 3051 may be a conveyor belt, an auger conveyor, gravity, blower, or combinations thereof. Typical solid products of a thermal cracking reaction include mostly carbon black, metal, ash and other impurities. They are most often in the form of powder, particles or flakes.

Figure 2A:
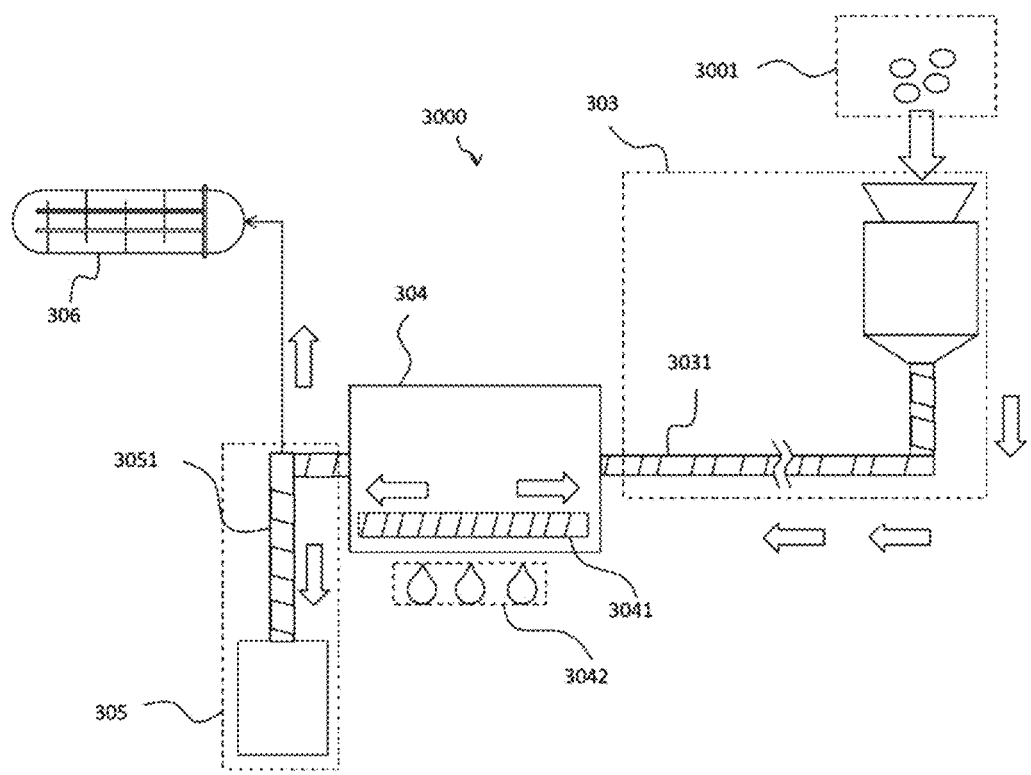
FIG. 2A is a schematic diagram of a prior art thermal cracking system with a rotary kiln reactor.
Figure 2B:
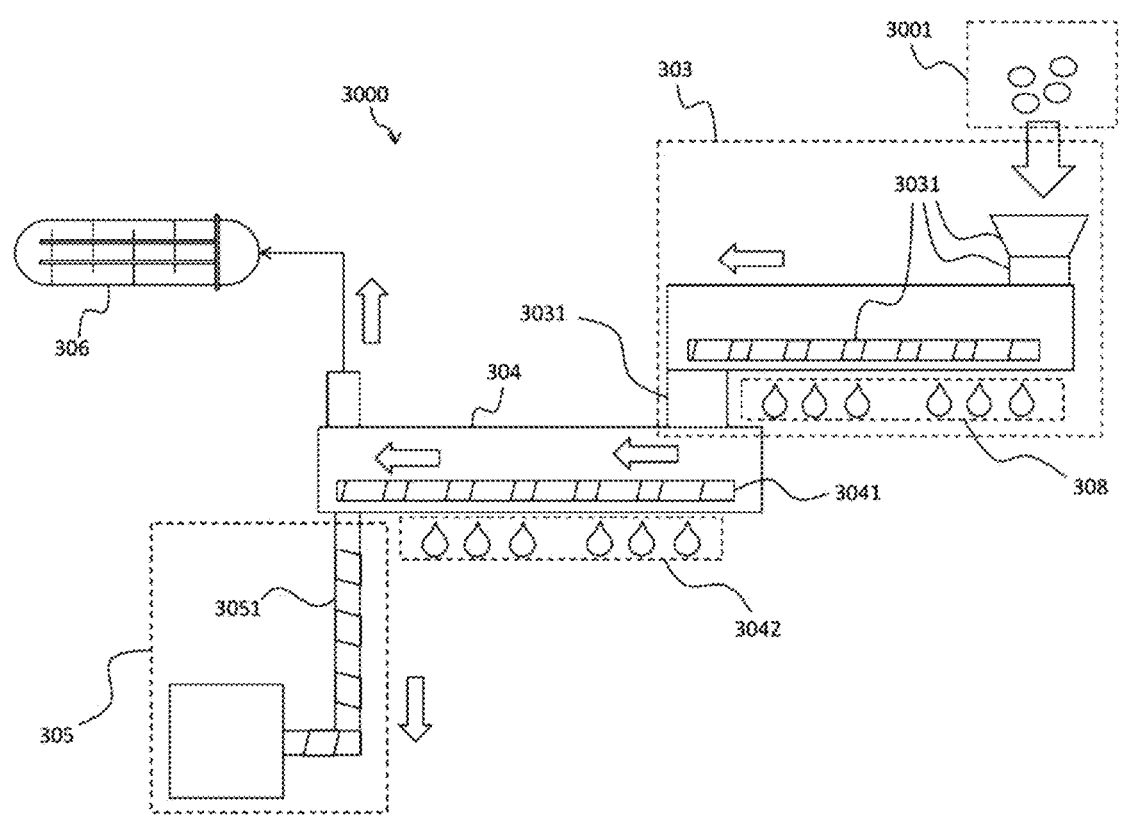
FIG. 2B is a schematic diagram of a prior art thermal cracking system with an auger reactor.

A thermal cracking system generally employs either a rotary kiln reactor or an auger reactor. Reference is now made to FIG. 2A and FIG. 2B, wherein FIG. 2A is a schematic diagram of a prior art thermal cracking system 3000 which is equipped with a rotary kiln reactor 304, and FIG. 2B is a schematic diagram of a prior art thermal cracking system 3000 which is equipped with an auger reactor 304.

As shown in FIGS. 2A and 2B, the reactor 304 comprises a reactant transport device 3041 and a reactor heating device 3042.

The reactant transport device 3041 is used to move the solid inside the reactor 304 towards a predetermined direction. As shown in FIG. 2A, in the case of a rotary kiln reactor, solid inside the reactor 304 is moved towards the upstream end of material flow i.e. towards feed module 303 during the reaction, and towards the downstream end i.e. towards the product discharge module 305 during discharge. On the other hand, as shown in FIG. 2B, in the case of an auger reactor, solid inside the reactor 304 is moved towards the downstream end i.e. towards solid product discharge module 305 at all time. The reactant transport device 3041 may comprise a conveyor belt, an auger conveyor, gravity, blower, or combinations thereof.

The reactor heating device 3042 is used to provide heat to the reactor 304, raising the temperature of the solid therein to a predetermined range where the thermal cracking reaction of the solid takes place. The reactor heating device 3042 may comprise one or multiple oil burners, gas burners, electrical heaters, or combinations thereof.

As shown in FIG. 2B, in the case of an auger reactor, the feed module 303 may optionally comprise a feed material heater 308 for preheating the feed material to a temperature near or inside a predetermined thermal cracking reaction temperature range. The feed material heater 308 may comprise one or multiple oil burners, gas burners, electrical heaters, or combinations thereof. When the feed material heater 308 is present, the feed material transport device 3031 is preferably to be an auger conveyor.

Figure 2C:
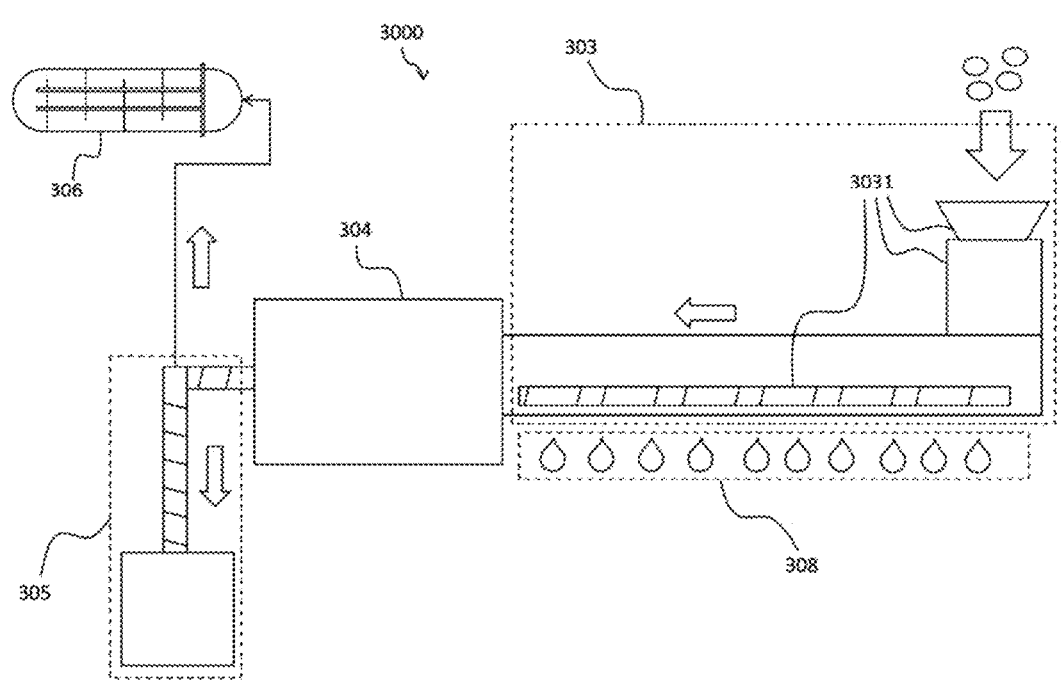
FIG. 2C is a schematic diagram of another prior art thermal cracking system with a rotary kiln reactor.

Reference is now made to FIG. 2C, which is a schematic diagram of another prior art thermal cracking system which is equipped with a rotary kiln reactor. As shown in FIG. 2C, in the case of a rotary kiln reactor, the feed module 303 may also optionally comprise a feed material heater 308 for preheating the feed material to a temperature near or inside a predetermined thermal cracking reaction temperature range. In such a configuration, the portion of the feed material transport device 3031 to be heated by the feed material heater 308 is preferably to be an auger conveyor.

Figure 2D:
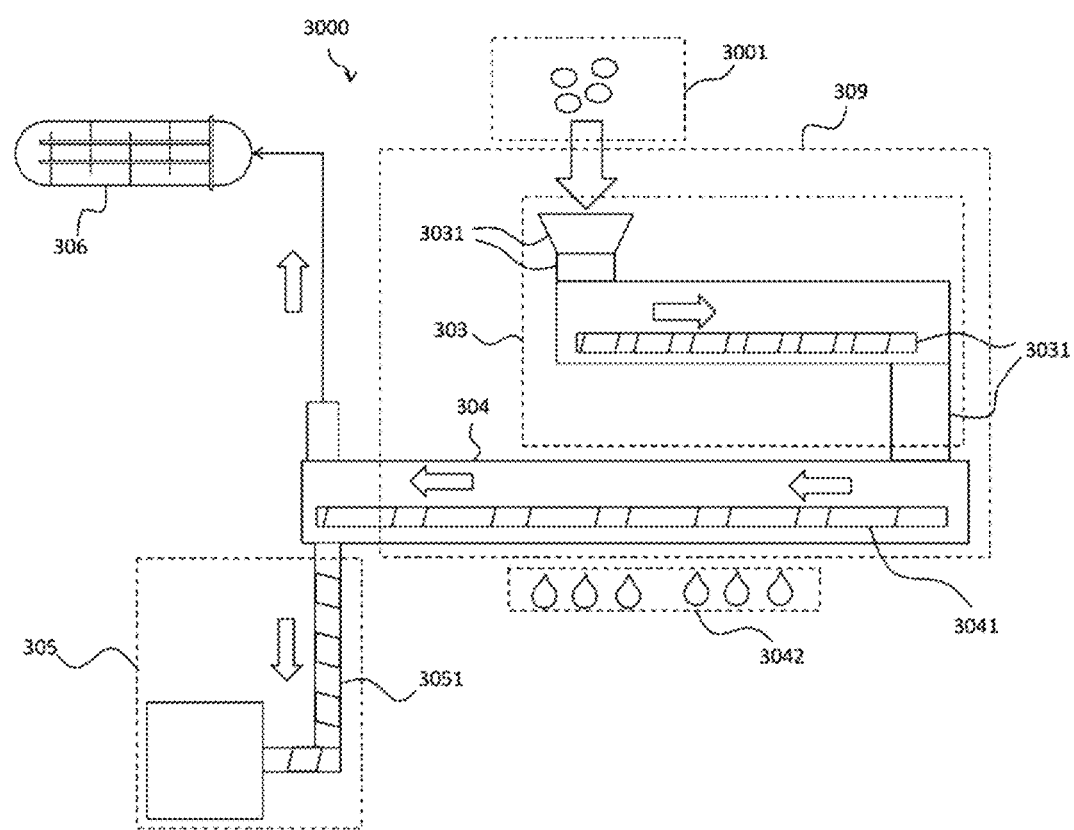
FIG. 2D is a schematic diagram of another prior art thermal cracking system with an auger reactor.

Reference is now made to FIG. 2D, which is a schematic diagram of another prior art thermal cracking system 3000 which is equipped with an auger reactor. As shown in FIG. 2D, in the case of an auger reactor, the thermal cracking system 3000 may further comprise a casing 309 for thermal insulation. The casing 309 encloses the feed module 303 and the reactor 304, so that heat provided by the reactor heating device 3042, in addition to be able to heat the reactor 304, can also be able to heat the feed module 303. As a result, use of the casing 309 enables the reactor heating device 3042 to also serve as the feed material heater 308. Usually, not the entire feed material transport device 3031 is enclosed in the casing 309, but only a portion of the feed material transport device 3031 is enclosed by the casing 309, and for that portion the feed material transport device 3031 is preferably to be an auger conveyor.

The invention provides a thermal cracking system which differs from those illustrated in FIG. 1 and FIG. 2A to FIG. 2D in that it comprises a vacuum zone in the feed module 303. In other words, the vacuum zone is set upstream of the reactor 304. The feed material enters the feed module 303 from the outside environment 3001, and gets transported by the feed material transport device 3031 towards the reactor 304. On the way to the reactor 304, the feed material passes through the vacuum zone. Because the feed material passes this vacuum zone before it enters the reactor 304, this vacuum zone will be referred to hereinafter as a pre-reactor vacuum zone.

The pre-reactor vacuum zone comprises at least three components: a feed material inlet, a feed material outlet and one or multiple vacuum points. With the aid of the feed material transport device 3031, the feed material enters the pre-reactor vacuum zone through the feed material inlet, and leaves the pre-reactor vacuum zone through the feed material outlet, and into the downstream material passage, continuing its journey towards the reactor 304. The vacuum points are connected to one or multiple vacuum means which continuously extracts air out of the pre-reactor vacuum zone. The feed material inlet may be connected to the material passage upstream thereof, or directly to the outside environment 3001. The feed material outlet may be connected to the material passage downstream thereof, or directly to the reactor 304.

Figure 3A:
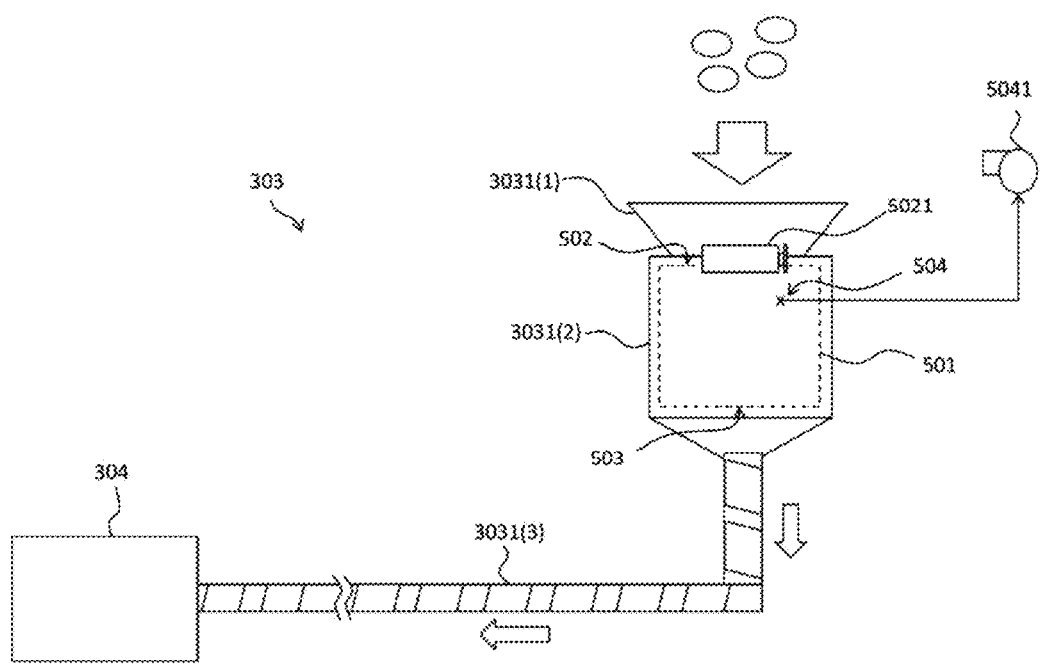
FIG. 3A is a schematic diagram of a feed module according to an embodiment of the invention.

Reference is now made to FIG. 3A, which is a schematic diagram of a feed module 303 according to an embodiment of the invention. As shown in FIG. 3A, in this embodiment, the feed module 303 comprises a pre-reactor vacuum zone 501 which comprises a feed material inlet 502, a feed material outlet 503 and one or multiple vacuum points 504. A switch 5021 is set at the feed material inlet 502 for controlling the flow rate at which the accompanying air enters the pre-reactor vacuum zone 501 along with the feed material. The switch 5021 may comprise a valve (such as a knife valve, ball valve, rotary valve, etc., or combinations thereof), an air curtain, or combination thereof. The switch 5021 implemented with a valve or an air curtain works in different ways, as explained further below. When implemented with an air curtain, the switch 5021 controls the air flow rate directly. When implemented with a valve, the switch 5021 indirectly controls the air flow rate by controlling the speed at which the feed material enters the pre-reactor vacuum zone 501. In the case of direct control, the switch 5021 comprises an air curtain, and the flow rate of incoming air is controlled by adjusting the strength of air jet of the air curtain. In the case of indirect control, the switch 5021 may comprise a knife valve, ball valve, rotary valve, etc., or combinations thereof, and the speed at which the feed material enters the pre-reactor vacuum zone 501 is controlled by adjusting the opening size of the valve(s) employed. The feed material outlet 503 is open-end. The vacuum point 504 is set in the neighborhood of the feed material inlet 502, and is connected to one or multiple vacuum means 5041. The vacuum means 5041 may be a vacuum pump, blower, or combinations thereof. The feed material transport device 3031 may comprise a conveyor belt, an auger conveyor, or combinations thereof.

Figure 3B:
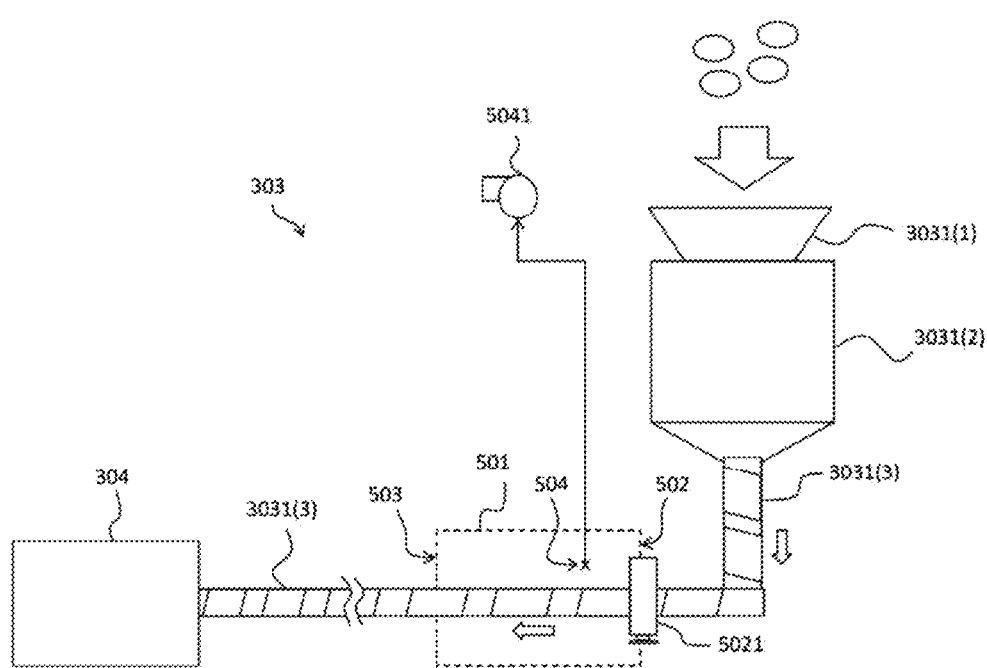
FIG. 3B is a schematic diagram of a feed module according to another embodiment of the invention.

Reference is now made to FIG. 3B, which is a schematic diagram of a feed module 303 according to another embodiment of the invention. As shown in FIG. 3B, in this embodiment, the pre-reactor vacuum zone 501 is set at an alternative location on the feed module 303. By comparing FIG. 3A and FIG. 3B, it can be seen that when set at different locations, the pre-reactor vacuum zone 501 may employ a different feed material transport device 3031 (the feed material transport device 3031 in FIG. 3A, which comprises 3031(1) and 3031(2), is implemented with gravity, while the feed material transport device 3031 in FIG. 3B, which comprises 3031(3) only, is implemented with a conveyor belt, an auger conveyor or combination thereof).

In the embodiments in FIG. 3A and FIG. 3B, the switch 5021 and the vacuum means 5041 are in communication to ensure that the extraction rate of air from the pre-reactor vacuum zone 501 is always equal to or greater than the flow rate of air entering the pre-reactor vacuum zone 501, so that air is removed in a real-time manner as the feed material passes through the pre-reactor vacuum zone 501, and as a result essentially no air is flowing alongside the moving feed material towards the reactor 304 after the pre-reactor vacuum zone 501. The switch 5021 controls the flow rate of air entering the pre-reactor vacuum zone 501. On the other hand, the rate at which air is extracted from the pre-reactor vacuum zone 501 is controlled by the vacuum means 5041. Therefore, as the switch 5021 and the vacuum means 5041 are in communication, the switch 5021 can always feed the vacuum means 5041 with information on estimated flow rate of air entering the pre-reactor vacuum zone 501, and the vacuum 5041 can always respond to that information and adjusts the strength of air extraction from the pre-reactor vacuum zone 501.

Figure 3C:
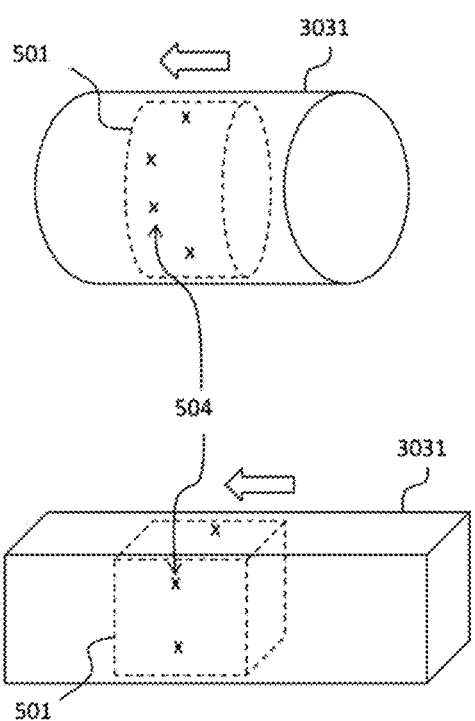
FIG. 3C is a schematic diagram of arrangement of the vacuum points on the feed material transport device according to an embodiment of the invention.
Figure 3D:
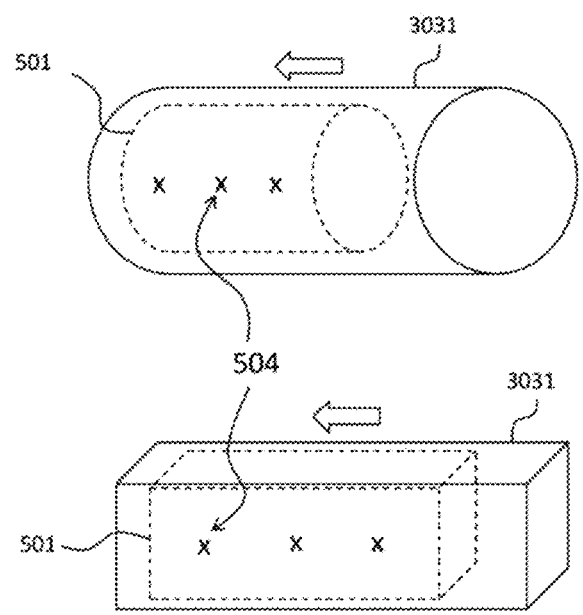
FIG. 3D is a schematic diagram of arrangement of the vacuum points on the feed material transport device according to another embodiment of the invention.

Reference is now made to FIG. 3C and FIG. 3D, wherein FIG. 3C is a schematic diagram of arrangement of the vacuum points 504 on the feed material transport device 3031 according to an embodiment of the invention, and FIG. 3D is a schematic diagram of arrangement of the vacuum points 504 on the feed material transport device 3031 according to another embodiment of the invention. As shown in FIG. 3C and FIG. 3D, the vacuum points 504 may be distributed around the feed material transport device 3031, along the feed material transport device, or combinations thereof. It should be noted that only the casing of the feed material transport device 3031 is shown in FIG. 3C and FIG. 3D, the actual conveyor (conveyor belt, auger conveyor, etc.) is included in the casing but not shown.

Figure 3E:
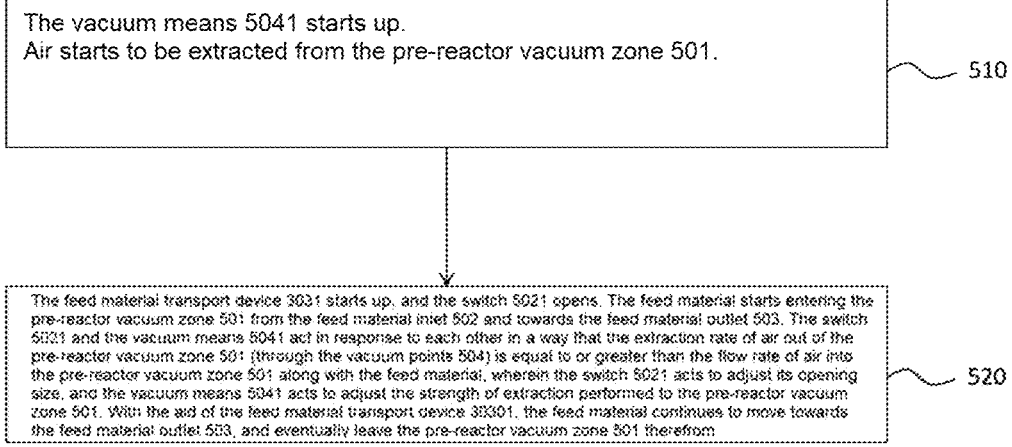
FIG. 3E is a flowchart of the vacuum creation process in the feed material transport device in the feed module illustrated in FIG. 3A to FIG. 3D.

Reference is now made to FIG. 3E, which is a flowchart of the vacuum creation process in the feed material transport device 3031 of the feed module 303 illustrated in FIG. 3A to FIG. 3D. The process includes:

Step 510 The vacuum means 5041 starts up. Air starts to be extracted from the pre-reactor vacuum zone 501.

Step 520 The feed material transport device 3031 starts up, and the switch 5021 opens. The feed material starts entering the pre-reactor vacuum zone 501 from the feed material inlet 502 and towards the feed material outlet 503. The switch 5021 and the vacuum means 5041 act in response to each other in a way that the extraction rate of air out of the pre-reactor vacuum zone 501 (through the vacuum points 504) is equal to or greater than the flow rate of air into the pre-reactor vacuum zone 501 along with the feed material, wherein the switch 5021 acts to adjust its opening size, and the vacuum means 5041 acts to adjust the strength of extraction performed to the pre-reactor vacuum zone 501. With the aid of the feed material transport device 30301, the feed material continues to move towards the feed material outlet 503, and eventually leave the pre-reactor vacuum zone 501 therefrom.

Figure 3F:
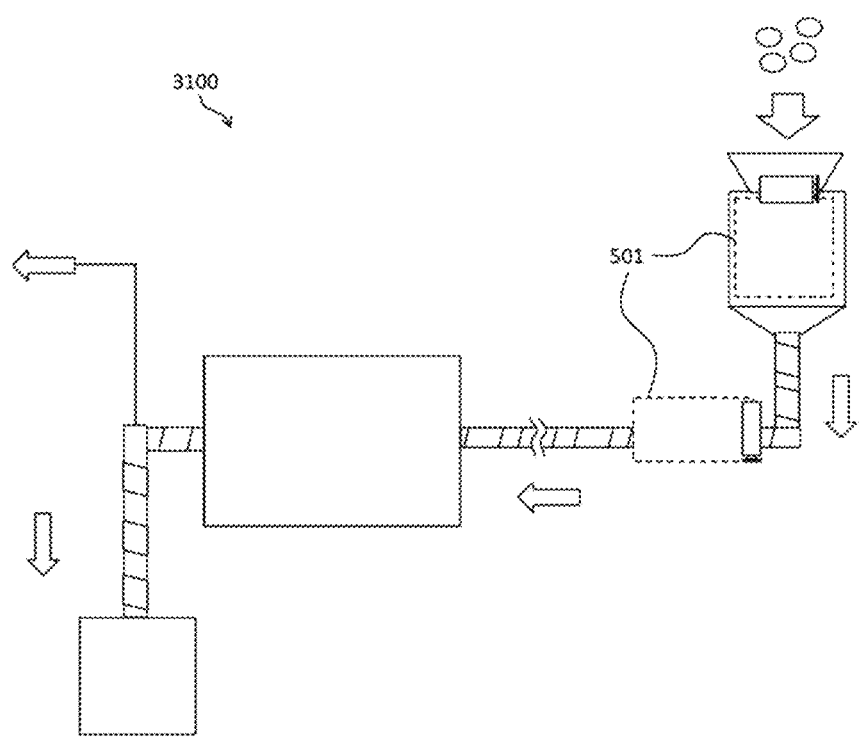
FIG. 3F is a schematic diagram of a thermal cracking system according to an embodiment of the invention.

Reference is now made to FIG. 3F, which is a schematic diagram of a thermal cracking system 3100 according to an embodiment of the invention. As shown in FIG. 3F, the thermal cracking system 3100 is essentially equal to the prior art thermal cracking system 3000 illustrated in FIG. 2A except for the introduction of the pre-reactor vacuum zone 501 described in conjunction with FIG. 3A to FIG. 3E. In one embodiment, the thermal cracking system 3100 comprises multiple pre-reactor vacuum zones 501, so that they can operate in alternation when maintenance downtime is necessary.

Figure 3G:
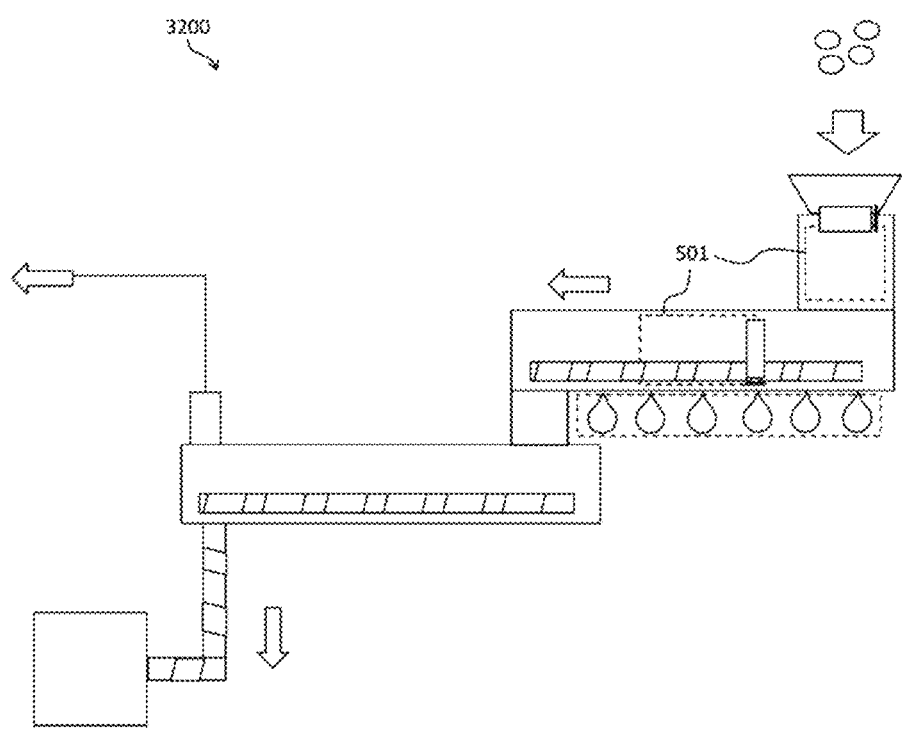
FIG. 3G is a schematic diagram of a thermal cracking system according to another embodiment of the invention.

Reference is now made to FIG. 3G, which is a schematic diagram of a thermal cracking system 3200 according to another embodiment of the invention. As shown in FIG. 3G, the thermal cracking system 3200 is essentially equal to the prior art thermal cracking system 3000 illustrated in FIG. 2B except for the introduction of the pre-reactor vacuum zone 501 described in conjunction with FIG. 3A to FIG. 3E. In one embodiment, the thermal cracking system 3200 comprises multiple pre-reactor vacuum zones 501, so that they can operate in alternation when maintenance downtime is necessary.

Figure 4A:
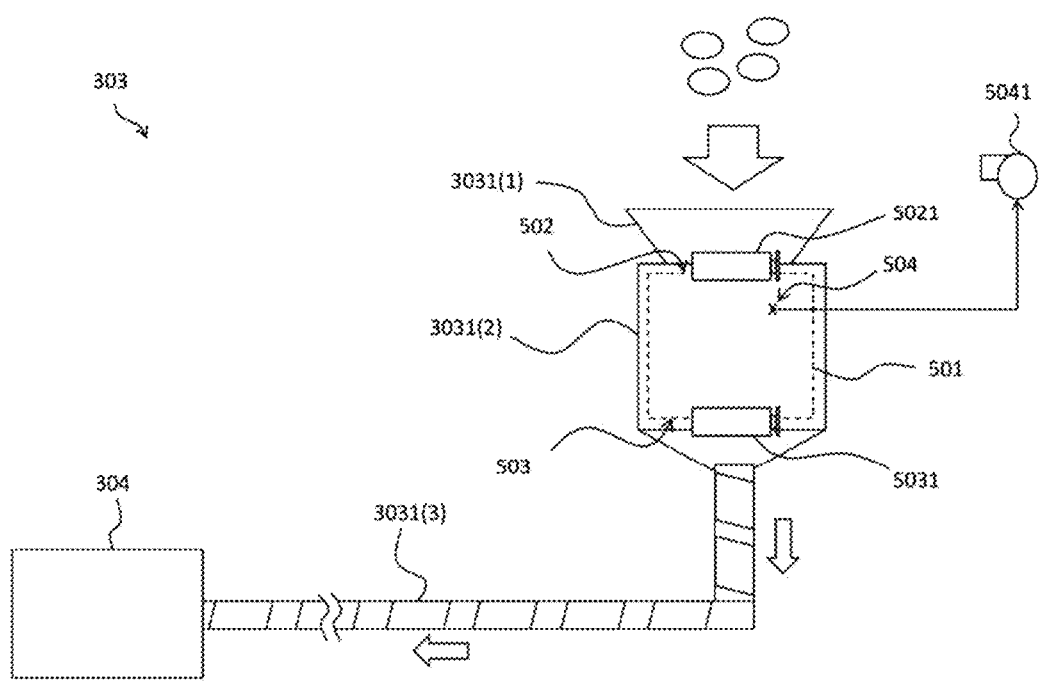
FIG. 4A is a schematic diagram of a feed module according to an embodiment of the invention.

Reference is now made to FIG. 4A, which is a schematic diagram of a feed module 303 according to an embodiment of the invention. As shown in FIG. 4A, the feed module 303 comprises a pre-reactor vacuum zone 501, which comprises a feed material inlet 502, a feed material outlet 503, and one or multiple vacuum points 504. A switch 5021 is set at the feed material inlet 502 for controlling the flow rate at which the accompanying air enters the pre-reactor vacuum zone 501 along with the feed material. The switch 5021 may comprise a valve (such as a knife valve, ball valve, rotary valve, etc., or combinations thereof), an air curtain, or combination thereof. A switch 5031 is set at the feed material outlet 503 for confining air inside the pre-reactor vacuum zone 501. The switch 5031 may comprise a knife valve, ball valve, rotary valve, etc., or combinations thereof. The vacuum points 504 are connected to one or multiple vacuum means 5041 which extracts air out of the pre-reactor vacuum zone 501.

Also as shown in FIG. 4A, in this embodiment, the feed module 303 comprises three portions as that described in FIG. 3B, wherein the first of portion comprises a feed material transport device 3031(1) employing gravity, the second portion comprises a feed material transport device 3031(2) also employing gravity, the third portion comprises a feed material transport device 3031(3) employing a conveyor belt, an auger conveyor or combinations thereof. Implementation of the feed material transport device 3031 in the pre-reactor vacuum zone 501 is dependent on the selected location of the pre-reactor vacuum zone 501 in the feed module 303. In this embodiment, the pre-reactor vacuum zone 501 is set where the feed material transport device 3031(2) is implemented with gravity.

Figure 4B:
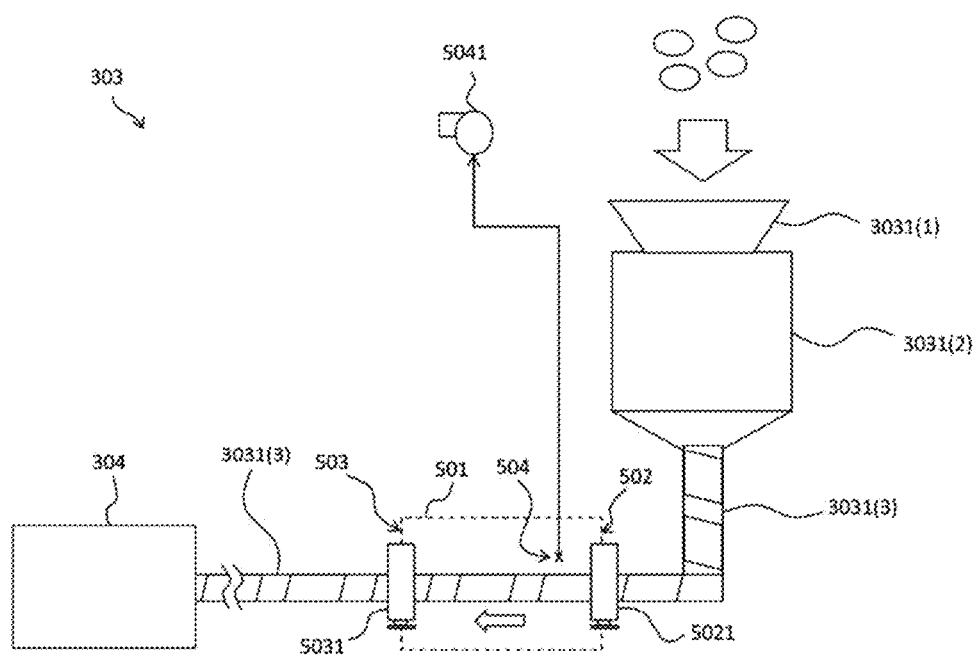
FIG. 4B is a schematic diagram of a feed module according to another embodiment of the invention.

Reference is now made to FIG. 4B, which is a schematic diagram of a feed module 303 according to still another embodiment of the invention. As shown in FIG. 4B, in this embodiment, the pre-reactor vacuum zone 501 is set at an alternative location of the feed module 303. By comparing FIG. 3A and FIG. 3B, it can be seen that when set at different locations, the pre-reactor vacuum zone 501 may employ a different feed material transport device 3031 (the feed material transport device 3031 in FIG. 4A is implemented with gravity, while the feed material transport device 3031 in FIG. 4B is implemented with a conveyor belt, an auger conveyor or combination thereof).

In the embodiments of FIG. 4A and FIG. 4B, the switch 5021, switch 5031 and vacuum means 5041 are in communication to ensure that only after air that had entered the pre-reactor vacuum zone 501 has been extracted out of the pre-reactor vacuum zone 501, would the feed material be allowed to leave the pre-reactor vacuum zone 501. First, the switch 5021 opens and the switch 5031 closes, the feed material enters and accumulates in the pre-reactor vacuum zone 501. When the amount of feed material inside the pre-reactor vacuum zone 501 reaches a predetermined threshold, the switch 5021 closes and the vacuum means 5041 starts up. Air inside the pre-reactor vacuum zone 504 starts to be extracted out, and when the pressure inside the pre-reactor vacuum zone 501 drops below a predetermined threshold, indicating that the pre-reactor vacuum zone 501 has been substantially vacuumed, the switch 5031 opens and the feed material resume moving towards the reactor 304.

Figure 4C:
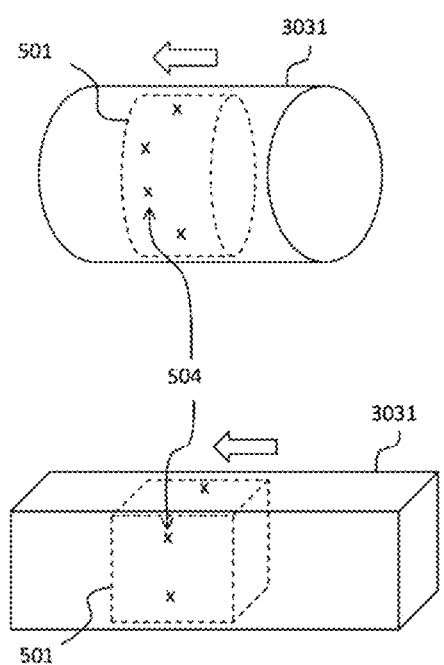
FIG. 4C is a schematic diagram of arrangement of the vacuum points on the feed material transport device according to an embodiment of the invention.
Figure 4D:
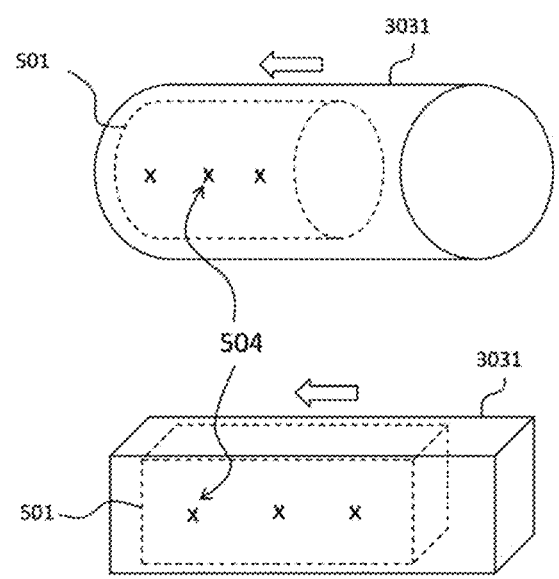
FIG. 4D is a schematic diagram of arrangement of the vacuum points on the feed material transport device according to another embodiment of the invention.

Reference is now made to FIG. 4C and FIG. 4D, wherein FIG. 4C is a schematic diagram of arrangement of the vacuum points 504 on the feed material transport device 3031 according to an embodiment of the invention, and FIG. 4D is a schematic diagram of arrangement of the vacuum points 504 on the feed material transport device 3031 according to another embodiment of the invention. As shown in FIG. 4C and FIG. 4D, the vacuum points 504 may be distributed around the feed material transport device 3031, along the feed material transport device, or combinations thereof. It should be noted that only the casing of the feed material transport device 30301 is shown in FIG. 4C and FIG. 4D, the actual conveyor (conveyor belt, auger conveyor, etc.) is included in the casing but not shown.

Figure 4E:
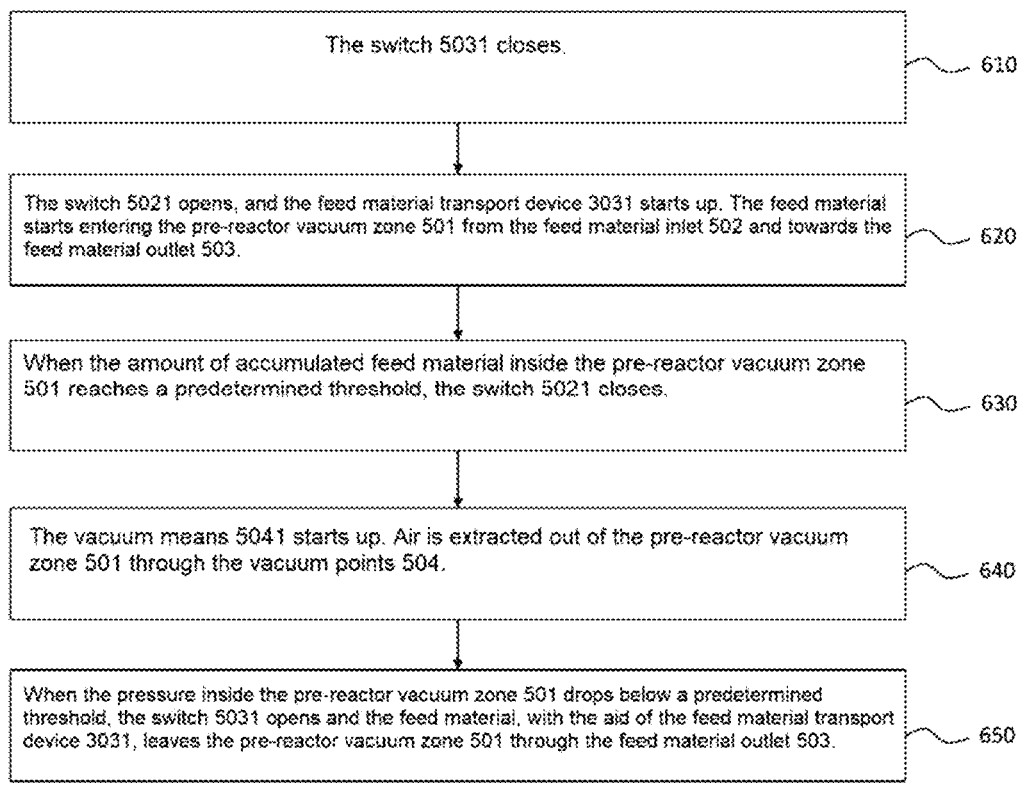
FIG. 4E is a flowchart of the vacuum creation process in the feed material transport device in the feed module illustrated in FIG. 4A to FIG. 4D.

Reference is now made to FIG. 4E, which is a flowchart of the vacuum creation process in the feed material transport device 3031 of the feed module 303 illustrated in FIG. 4A to FIG. 4D. The process includes:

Step 610 The switch 5031 closes.
Step 620 The switch 5021 opens, and the feed material transport device 3031 starts up. The feed material starts entering the pre-reactor vacuum zone 501 from the feed material inlet 502 and towards the feed material outlet 503.
Step 630 When the amount of accumulated feed material inside the pre-reactor vacuum zone 501 reaches a predetermined threshold, the switch 5021 closes.
Step 640 The vacuum means 5041 starts up. Air is extracted out of the pre-reactor vacuum zone 501 through the vacuum points 504.
Step 650 When the pressure inside the pre-reactor vacuum zone 501 drops below a predetermined threshold, the switch 5031 opens and the feed material, with the aid of the feed material transport device 3031, leaves the pre-reactor vacuum zone 501 through the feed material outlet 503.

Figure 4F:
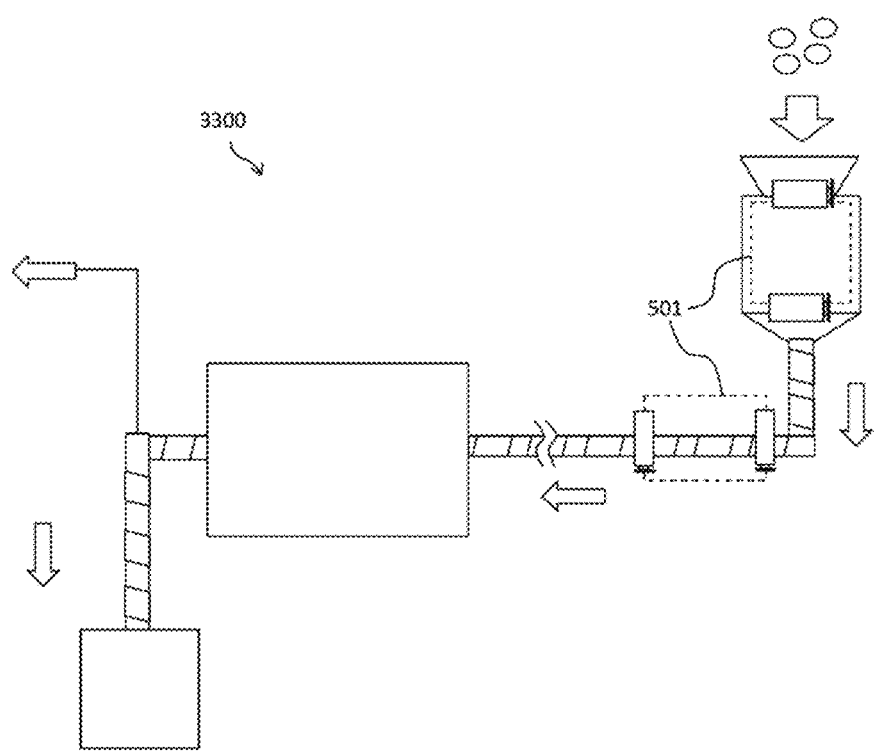
FIG. 4F is a schematic diagram of a thermal cracking system according to an embodiment of the invention.

Reference is now made to FIG. 4F, which is a schematic diagram of a thermal cracking system 3300 according to an embodiment of the invention. As shown in FIG. 4F, the thermal cracking system 3300 is essentially equal to the prior art thermal cracking system 3000 in FIG. 2A except for the introduction of the pre-reactor vacuum zone 501 described in conjunction with FIG. 4A to FIG. 4E. In one embodiment, the thermal cracking system 3300 comprises multiple pre-reactor vacuum zones 501, so that they can operate in alternation when maintenance downtime is necessary.

Figure 4G:
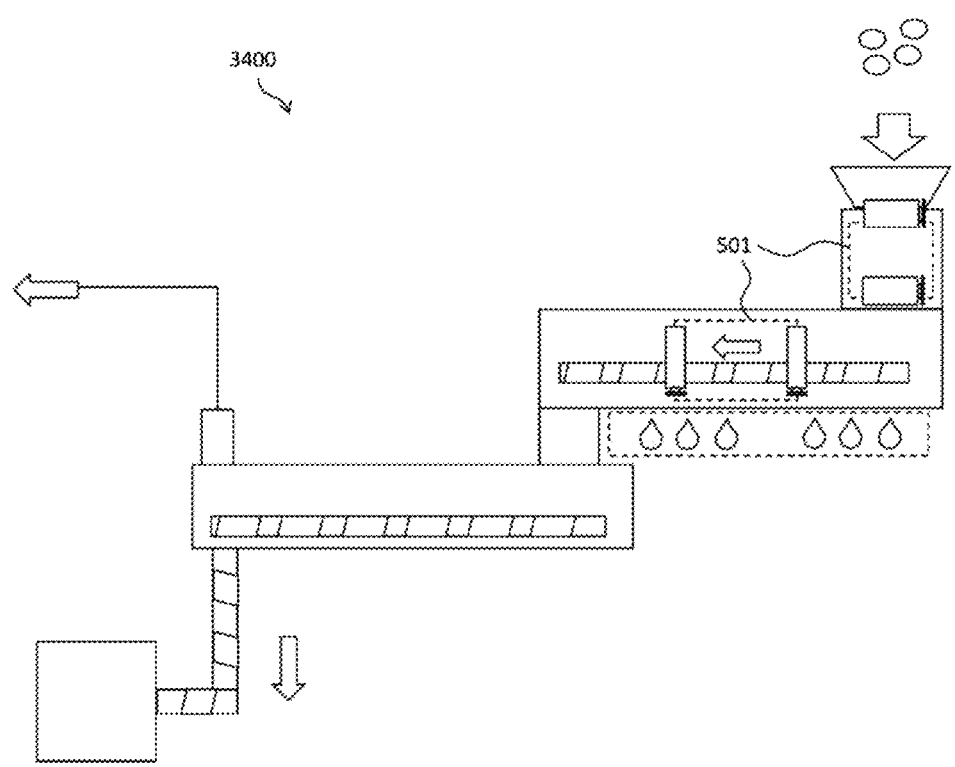
FIG. 4G is a schematic diagram of a thermal cracking system according to another embodiment of the invention.

Reference is now made to FIG. 4G, which is a schematic diagram of a thermal cracking system 3400 according to another embodiment of the invention. As shown in FIG. 4G, the thermal cracking system 3400 is essentially equal to the prior art thermal cracking system 3000 in FIG. 2B except for the introduction of the pre-reactor vacuum zone 501 described in conjunction with FIG. 4A to FIG. 4E. In one embodiment, the thermal cracking system 3400 comprises multiple pre-reactor vacuum zones 501, so that they can operate in alternation when maintenance downtime is necessary.

Figure 5A:
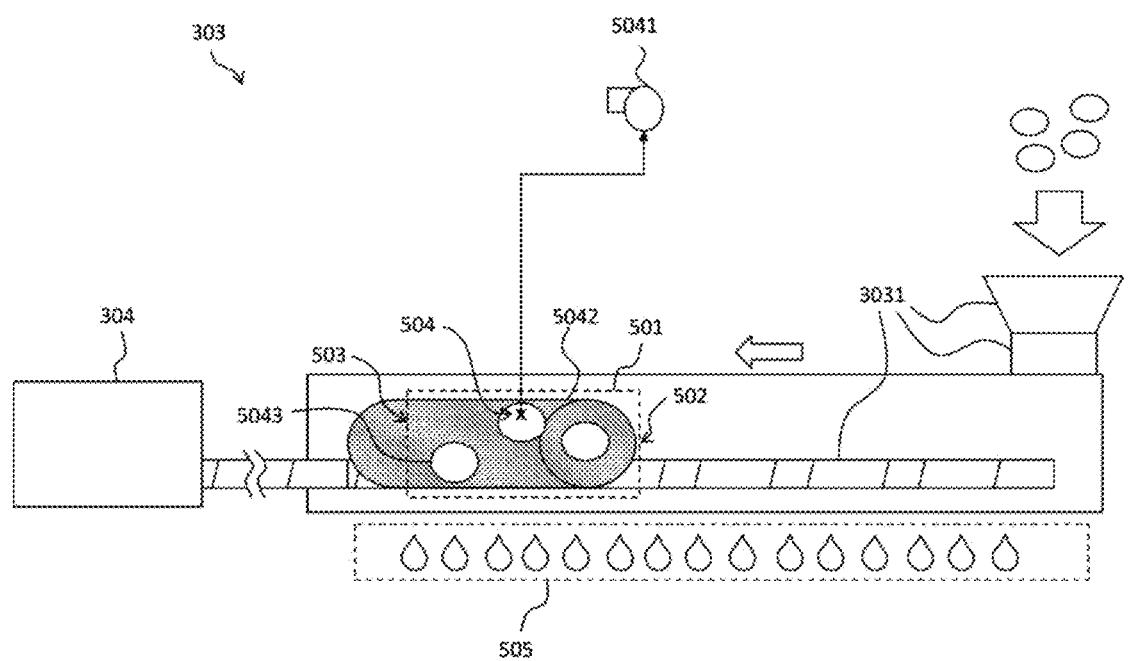
FIG. 5A is a schematic diagram of a feed module according to an embodiment of the invention.

Reference is now made to FIG. 5A, which is a schematic diagram of a feed module 303 according to an embodiment of the invention. As shown in FIG. 5A, in this embodiment, the pre-reactor vacuum zone 501 comprises a feed material inlet 502, a feed material outlet 503, one or multiple vacuum points 504 connected to one or multiple vacuum means 5041, and a heating device 505 for heating the feed material. Both the feed material inlet 502 and the feed material outlet 503 are open-ended. The vacuum points 504 are distributed along the direction of feed material flow. With the aid of the feed material transport device 3031, the feed material enters the pre-reactor vacuum zone 501 through the feed material inlet 502, and moves towards the feed material outlet 503. Along the way, the feed material gets heated by the heating device 505. The heating device 505 can be implemented by employing the prior art techniques, such as the feed material heater 308 in FIG. 2B and FIG. 2C, or the reactor heating device 3042 in FIG. 2D. In this embodiment, the portion of the feed material transport device 3031 which is heated by the heating device 505 is implemented by employing an auger conveyor.

In this embodiment, distribution of the vacuum points 504 is selected to begin around a location on the feed transport device 3031 where melting of the feed material starts taking place. From this point on, the feed material, originally in the form of solid particles, chunks, flakes, shreds or combinations thereof, becomes more and more molten. The molten solid is resin-like, flowable and has a tendency to join together. This makes pores among individual solid pieces to close. As a result, air molecules inside the pores are forced to agglomerate and become larger bubbles which is easier to be extracted through the vacuum points 504 by the vacuum means 5041.

Moreover, the molten feed material fills up the interior of the material passage, forming a natural barrier which holds off at least part of the incoming air flow. In other words, the molten feed material itself functions as the switch 5021 described in conjunction with FIG. 3A to FIG. 3C. With the aid of this "pseudo" switch, air flow into the pre-reactor vacuum zone 501 is slowed down, making it possible for the vacuum means 5041 to extract more air from the pre-reactor vacuum zone 501 with the same extraction strength.

These two phenomena combined makes the feed material to be gradually deprived of the accompanying air as it passes through the pre-reactor vacuum zone 501, even though no dedicated hardware such as valves, etc. is installed to help. Finally, only the feed material alone is leaving the pre-reactor vacuum zone 501 for the downstream material passage.

In one preferred embodiment, the temperature profile of the feed material transport device 3031 along the material flow direction is controlled by the heating device 505, and the location where the melting of the feed material begins is determined accordingly. For example, when the feed material is mainly composed of plastics, the melting temperature is selected to be 220~260° C., and when the feed material is mainly composed of waste tire, the melting temperature is selected to be 200~240° C. After the location of the beginning of melting is determined, distribution of the vacuum points 504 is determined accordingly.

Figure 5B:
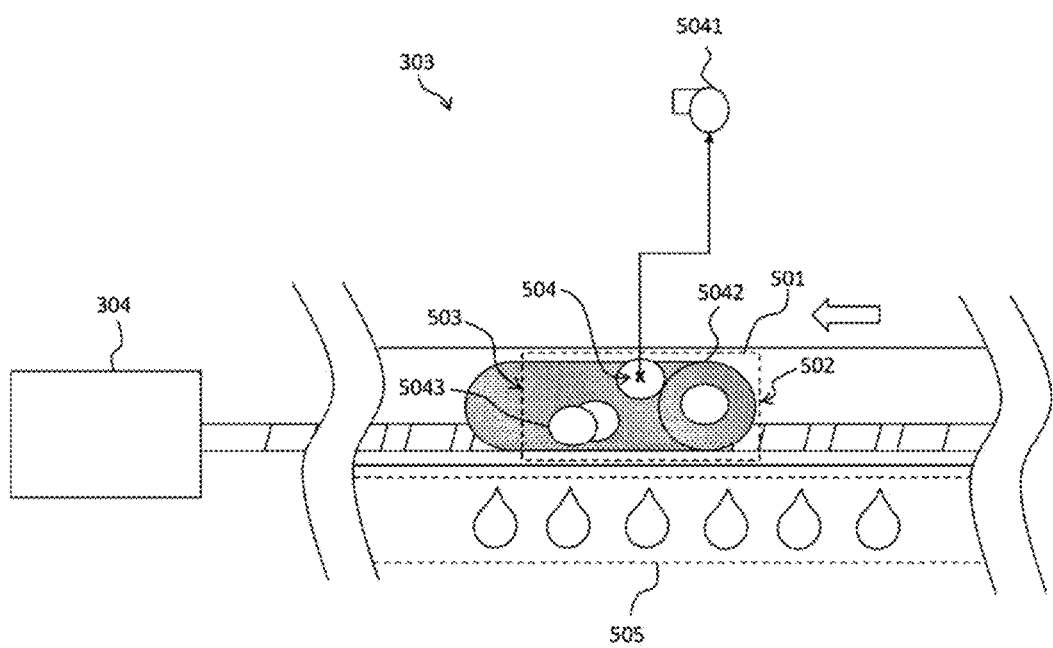
FIG. 5B is a schematic diagram illustrating the beginning of melting of feed material in the feed module.

Reference is now made to FIG. 5B, which is a schematic diagram illustrating the beginning of melting of feed material in the feed module 303, for example as that illustrated in FIG. 5A. As shown in FIG. 5B, in one preferred embodiment, distribution of the vacuum points 504 starts where formation of a molten material 5042 begins and onwards, extending along the feed material transport device 3031 towards the downstream end of the material flow.

Figure 5C:
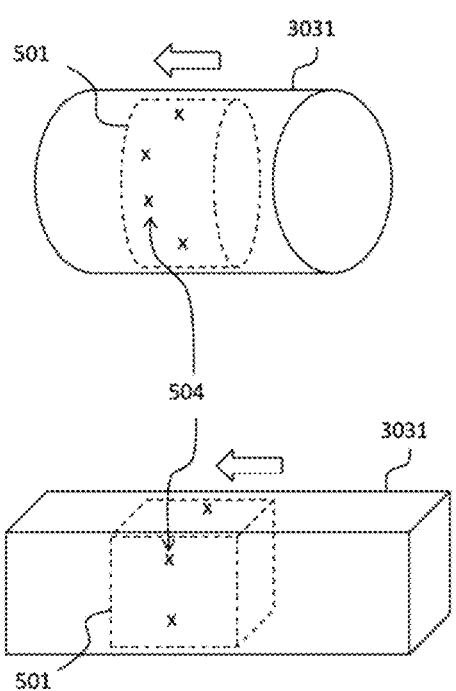
FIG. 5C is a schematic diagram of arrangement of the vacuum points on the feed material transport device according to an embodiment of the invention.
Figure 5D:
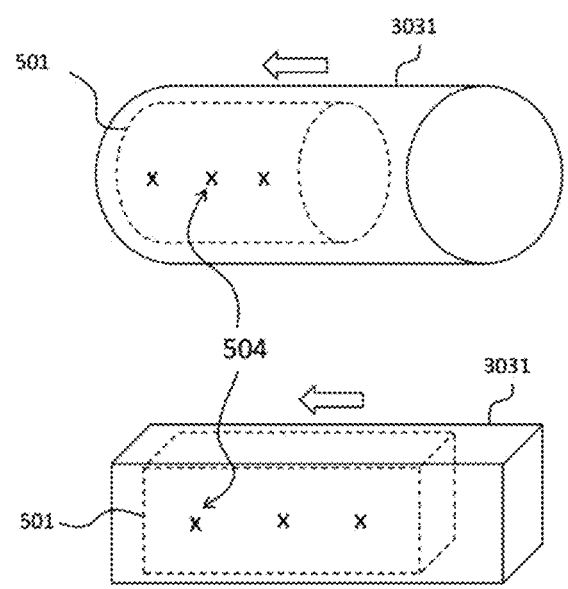
FIG. 5D is a schematic diagram of arrangement of the vacuum points on the feed material transport device according to another embodiment of the invention.

Reference is now made to FIG. 5C and FIG. 5D, wherein FIG. 5C is a schematic diagram of arrangement of the vacuum points 504 on the feed material transport device 3031 according to an embodiment of the invention, and FIG. 5D is a schematic diagram of arrangement of the vacuum points 504 on the feed material transport device 3031 according to another embodiment of the invention. As shown in FIG. 5C and FIG. 5D, the vacuum points 504 may be distributed around the feed material transport device 3031, along the feed material transport device, or combinations thereof. It should be noted that only the casing of the feed material transport device 3031 is shown in FIG. 5C and FIG. 5D, the actual conveyor (conveyor belt, auger conveyor, etc.) is included in the casing but not shown.

Figure 5E:
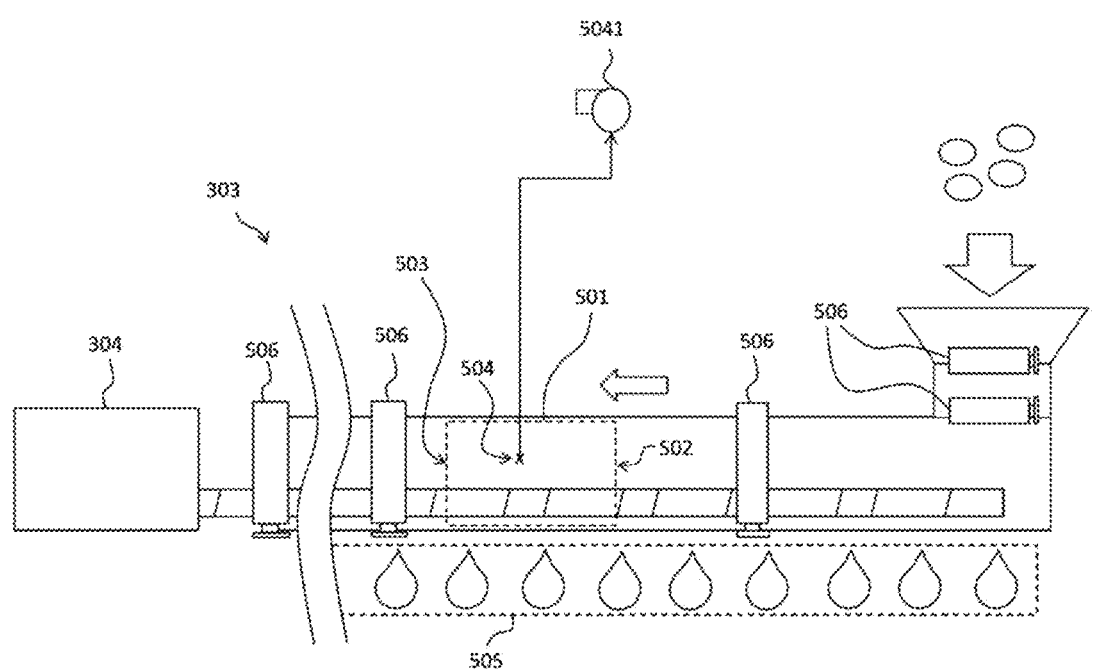
FIG. 5E is a schematic diagram of a pre-reactor vacuum zone which includes safety valves according to an embodiment of the invention.

Reference is now made to FIG. 5E, which is a schematic diagram of a pre-reactor vacuum zone 501 which includes a safety valve 506 according to an embodiment of the invention. As shown in FIG. 5E, the pre-reactor vacuum zone 501 further includes one or multiple safety valves 506 located upstream of the pre-reactor vacuum zone 501, downstream of the pre-reactor vacuum zone 501, or combinations thereof. The safety valves 506 are used to seal the material passage of the feed module 303 in situations where heating of the feed material needs to stop.

Figure 5F:
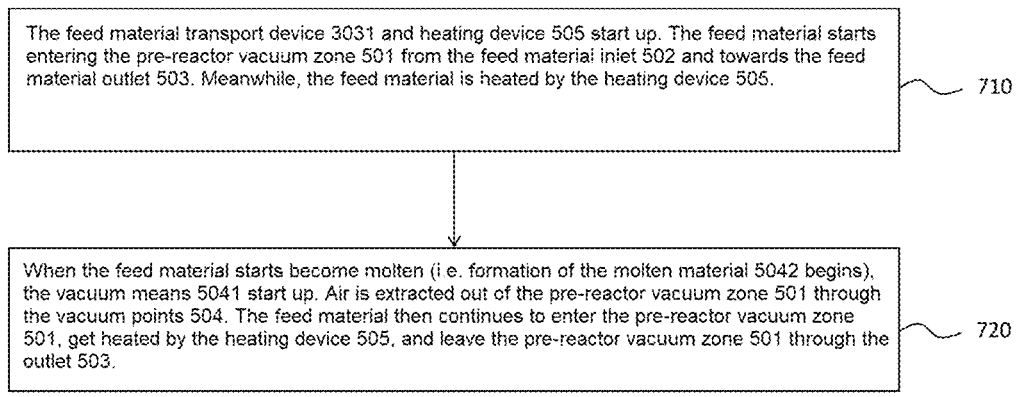
FIG. 5F is a flowchart of the vacuum creation process in the feed material transport device in the feed module illustrated in FIG. 5A to FIG. 5E.

Reference is now made to FIG. 5F, which is a flowchart of the vacuum creation process in the feed material transport device 3031 of the feed module 303 illustrated in FIG. 5A to FIG. 5E. The process includes:

Step 710 The feed material transport device 3031 and heating device 505 start up. The feed material starts entering the pre-reactor vacuum zone 501 from the feed material inlet 502 and towards the feed material outlet 503. Meanwhile, the feed material is heated by the heating device 505.

Step 720 When the feed material starts become molten (i.e. formation of the molten material 5042 begins), the vacuum means 5041 start up. Air is extracted out of the pre-reactor vacuum zone 501 through the vacuum points 504. The feed material then continues to enter the pre-reactor vacuum zone 501, get heated by the heating device 505, and leave the pre-reactor vacuum zone 501 through the outlet 503.

Figure 5G:
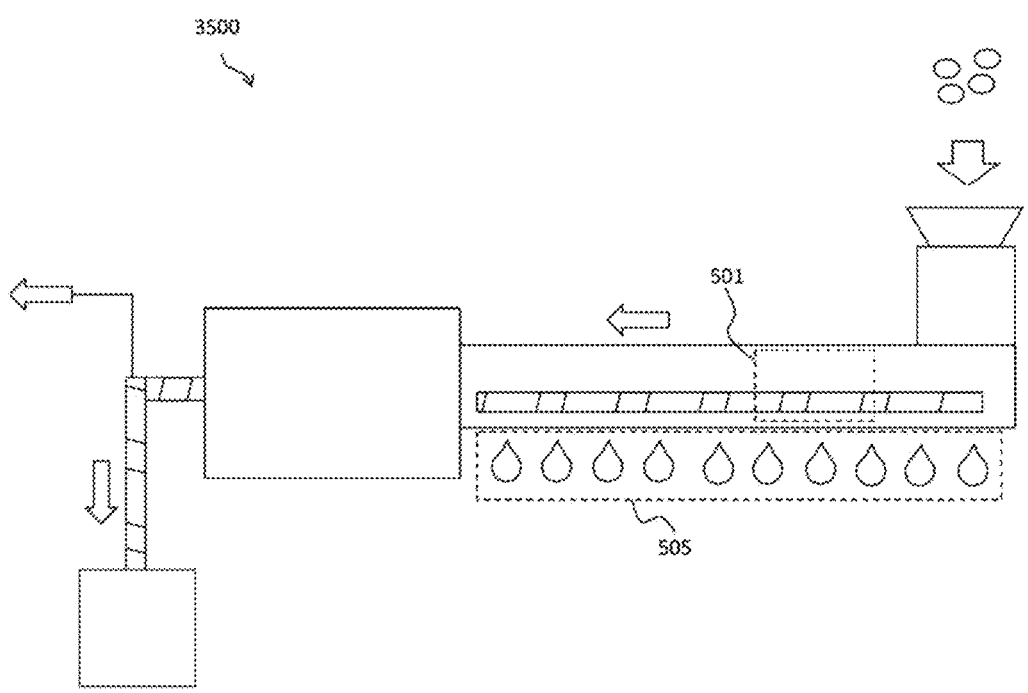
FIG. 5G is a schematic diagram of a thermal cracking system according to an embodiment of the invention.

Reference is now made to FIG. 5G, which is a schematic diagram of a thermal cracking system 3500 according to an embodiment of the invention. As shown in FIG. 5G, the thermal cracking system 3500 is essentially equal to the prior art thermal cracking system 3000 in FIG. 2C except for the introduction of the pre-reactor vacuum zone 501 described in conjunction with FIG. 5A to FIG. 5F. In one embodiment, the thermal cracking system 3500 comprises multiple pre-reactor vacuum zones 501, so that they can operate in alternation when maintenance downtime is necessary.

Figure 5H:
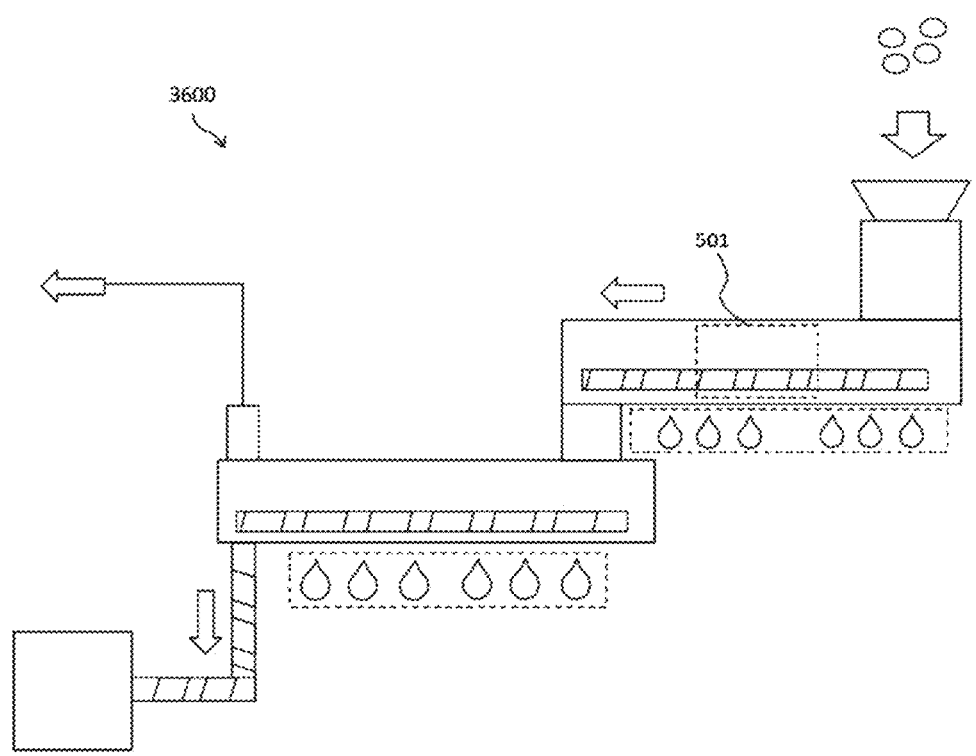
FIG. 5H is a schematic diagram of a thermal cracking system according to another embodiment of the invention.
Figure 51:
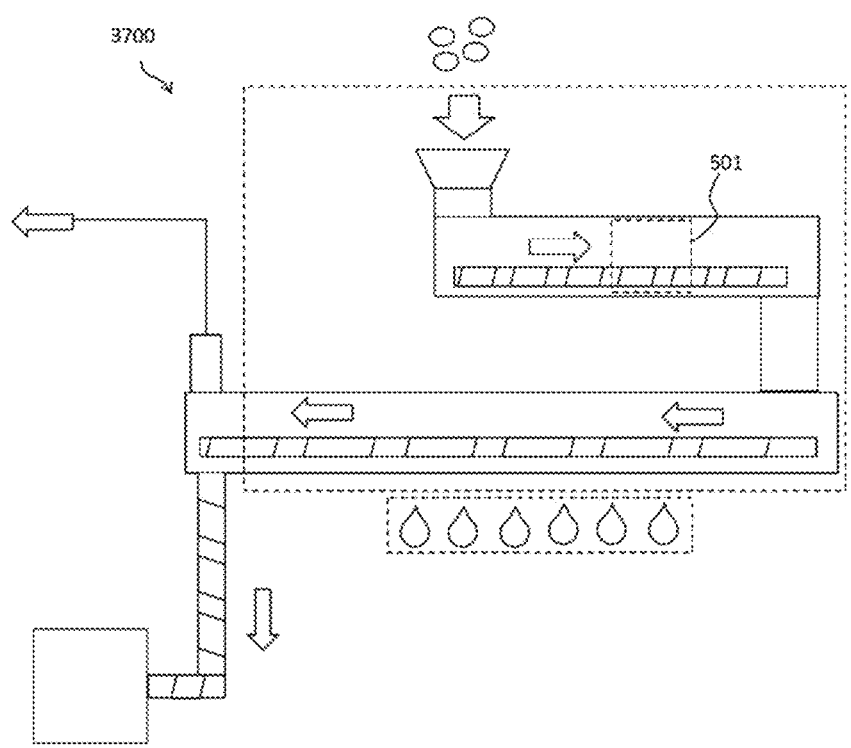

Reference is now made to FIG. 5H, which is a schematic diagram of a thermal cracking system 3600 according to still another embodiment of the invention. As shown in FIG. 5H, the thermal cracking system 3600 is essentially equal to the prior art thermal cracking system 3000 in FIG. 2B except for the introduction of the pre-reactor vacuum zone 501 described in conjunction with FIG. 5A to FIG. 5F. In one embodiment, the thermal cracking system 3600 comprises multiple pre-reactor vacuum zones 501, so that they can operate in alternation when maintenance downtime is necessary.

Reference is now made to FIG. 5I, which is a schematic diagram of a thermal cracking system 3700 according to yet another embodiment of the invention. As shown in FIG. 5I, the thermal cracking system 3700 is essentially equal to the prior art thermal cracking system 3000 in FIG. 2D except for the introduction of the pre-reactor vacuum zone 501 described in conjunction with FIG. 5A to FIG. 5F. In one embodiment, the thermal cracking system 3300 comprises multiple pre-reactor vacuum zones 501, so that they can operate in alternation when maintenance downtime is necessary.

Figure 6A:
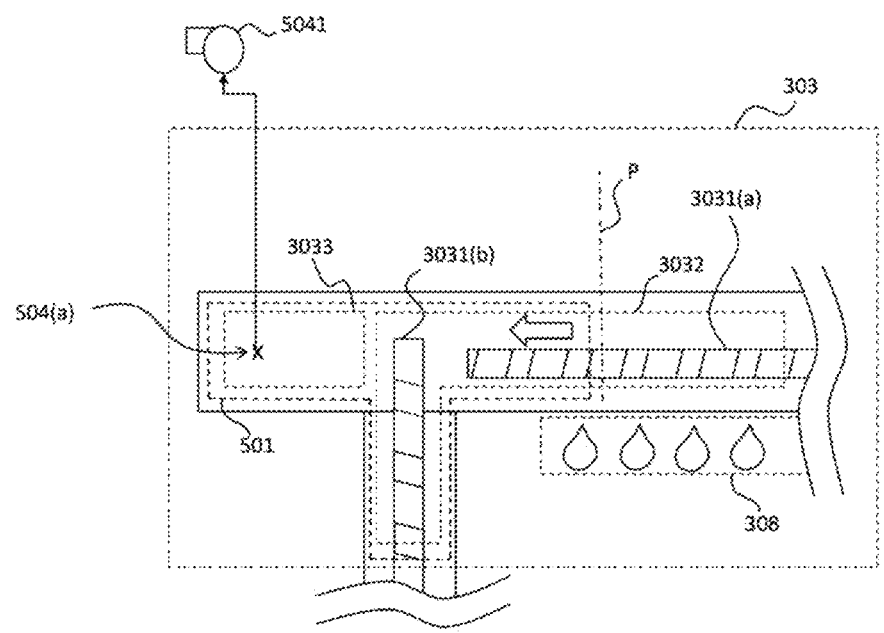
FIG. 6A is a schematic diagram of a pre-reactor vacuum zone according to an embodiment of the invention.

Reference is now made to FIG. 6A, which is a schematic diagram of a pre-reactor vacuum zone 501 according to an embodiment of the invention. As shown in FIG. 6A, in this embodiment, the feed module 303 is divided into a transporting portion 3032 and a non-transporting portion 3033. The interior of the transporting portion 3032 and the non-transporting portion 3033 is connected to each other. The dash line P indicates the location where the feed material starts to become molten. A feed material transport device 3031 is provided in the transporting portion 3032 for forcing the feed material to move towards a predetermined direction.

The feed material device 3031 may comprise one or multiple sub-feed material transport devices. For example, as shown in FIG. 6A, in this embodiment, the feed material transport device 3031 comprises two sub-feed material transport devices 3031(a) and 3031(b), respectively, wherein each of the sub-feed material transport devices is used to force the feed material to move towards a predetermined direction. The sub-feed material transport device 3031(a) forces the feed material to move from the right hand side of the drawing (which is the upstream end of the feed material flow) to the left hand side of the drawing, while the sub-feed material transport device 3031(b) forces the feed material to move downwards (which is the downstream end of the feed material flow).

It should be noted that as will be appreciated in those skilled in the art, the number of sub-feed material transport device is not limited to two, instead any number of sub-feed material device can be employed to best suit the design of the transporting portion 3031. It should also be noted that the sub-feed material transport device 3031(*a*) and 3031(*b*) (or say the direction of material flow therein) illustrated in FIG. 6A are set to be perpendicular to each other, but as will be appreciated by those skilled in the art, the angle between individual sub-feed material transport devices are not limited to be a right angle, instead any oblique angles may be employed to best suit the design of the transporting portion 3031. In other words, the sub-feed material transport devices 3031(*a*) and 3031(*b*) may form an inclined intersection to each other as well, without deviating from the invention concept of the transporting portion/non-transporting portion pair. For example, the sub-feed material transport device 3031(*a*) may be vertically inclined, and the feed material is transported up the hill to reach the sub-feed material transport device 3031(*b*) at the top of the sub-feed material transport device 3031(*a*). With the aid of the feed material heater 308, the feed material starts to become molten somewhere along the ramp, where the dash line P indicates.

The non-transporting portion 3033 comprises a hollow chamber for air molecules to flow in, and one or multiple vacuum points 504(*a*) are set in the chamber. The vacuum points 504(*a*) are connected to one or multiple vacuum means 5041 for extracting air molecules from the chamber through the vacuum points 504(*a*).

In this embodiment, the pre-reactor vacuum zone 501 includes both the transporting portion 3032 and non-transporting portion 3033 of the feed module 303. The feed material transport device 3031(*a*) and 3031(*b*) are configured such that the feed material moves inside the transporting portion 3032 but does not enter the non-transporting portion 3033. Air, however, can flow freely and thus will spontaneously flow into the non-transporting portion 3033 and gets extracted therein. As the feed material is forced to avoid the non-transporting portion 3033, greater vacuum strength can be applied to non-transporting portion 3033 without worrying about sucking in the feed material. Also in this embodiment, the preferred choice for the feed material transport device 3031 is an auger conveyor.

For instance, in the above example wherein the sub-feed material transport device 3031(*a*) is vertically inclined, gravity forces the molten feed material at the upper portion of the sub-feed transport device 3031(*a*) to press firmly on the unmelted feed material at the bottom portion of the sub-feed material transport device 3031(*a*). The molten material accumulates on the interface of the molten and the unmelted material (dash line P), filling up the interior of the local material passage. As a result, a plug forms out of the accumulating molten material which holds off at least part of the incoming air flow. The stowaway air molecules that make their way to the upper portion of the sub-feed material transport device 3031(*a*) gradually agglomerate into larger bubbles as the molten material is stirred and mixed while being transported (for example by an auger conveyor). The air bubbles eventually flow into the non-transporting portion 3033 spontaneously and get extracted therein.

Figure 6B:
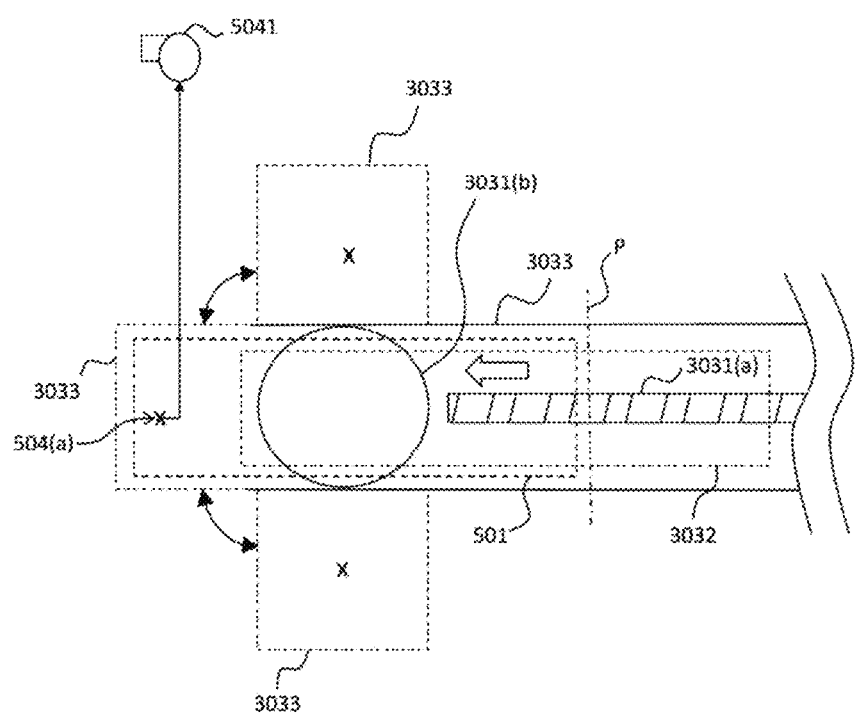
FIG. 6B is a top view of FIG. 6A.

Reference is now made to FIG. 6B, which is a top view of FIG. 6A. As shown in FIG. 6B, the non-transporting portion 3033 can be located right ahead of the transporting portion 3032, or to the side. Also, the number of the non-transporting portion 3033 in the pre-reactor vacuum zone 501 is not limited to one. Multiple non-transporting portions 3033 can be included in one pre-reactor vacuum zone 501.

Figure 6C:
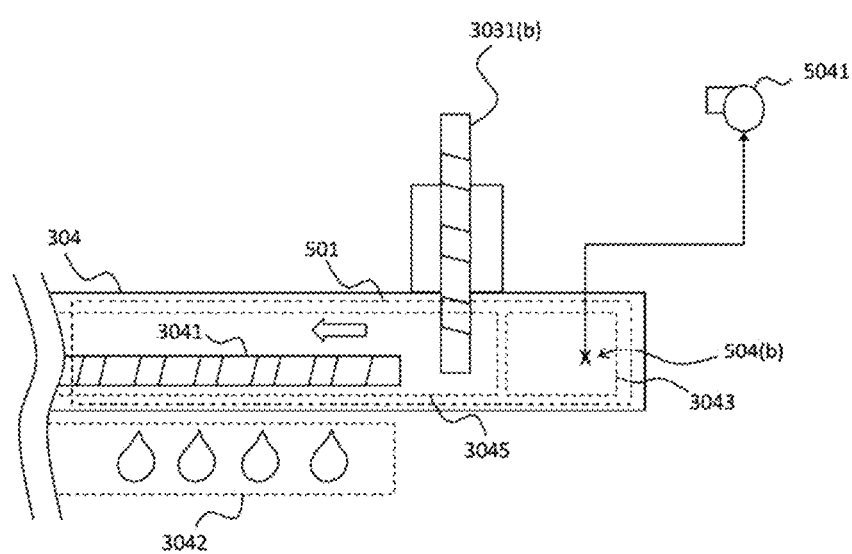
FIG. 6C is a schematic diagram of a pre-reactor vacuum zone according to another embodiment of the invention.

Reference is now made to FIG. 6C, which is a schematic diagram of the pre-reactor vacuum zone 501 according to another embodiment of the invention. The invention concept of the transporting portion/non-transporting portion pair can also be implemented in an auger type reactor 304. As shown in FIG. 6C, in this embodiment, the reactor 304 comprises a transporting portion 3045 and a non-transporting portion 3043, wherein a sub-feed material transport device 3031(*b*) and a reactant transport device 3041 are provided in the transporting portion 3045. The pre-reactor vacuum zone 501 comprises both the transporting portion 3045 and the non-transporting portion 3043. The feed material is forced by the sub-feed material transport device 3031(*b*) to move from the upstream material passage into the transporting portion 3045, and then by the reactant transport device 3041 to move further downstream (deeper into the reactor 304) where the thermal cracking reaction takes place. Meanwhile, the incoming air along with the feed material will spontaneously flow into the non-transporting portion 3043 and gets extracted by a vacuum means 5041 through one or multiple vacuum points 504(*b*) set in the non-transporting portion 3043. As in the embodiment described in conjunction with FIG. 6A, the presence of the non-transporting portion 3043 allows the vacuum means 5041 to apply a greater extraction strength to the non-transporting portion 3043 without worrying about sucking in the feed material. As a result, more effective air removal is achieved.

Also, as in the embodiment described in conjunction with FIG. 6A, individual transport devices may form inclined intersection with each other. For example, in FIG. 6C the sub-feed material transport device 3031(*b*) is perpendicular to the reactant transport device 3041 (or say the direction of material flow in 3031(*b*) is perpendicular to that in 3041), but as will be appreciated by those skilled in the art, the sub-feed material transport devices 3031(*b*) and the reactant transport device 3041 may form an inclined intersection to each other as well, without deviating the invention concept of the transporting portion/non-transporting portion pair.

Figure 6D:
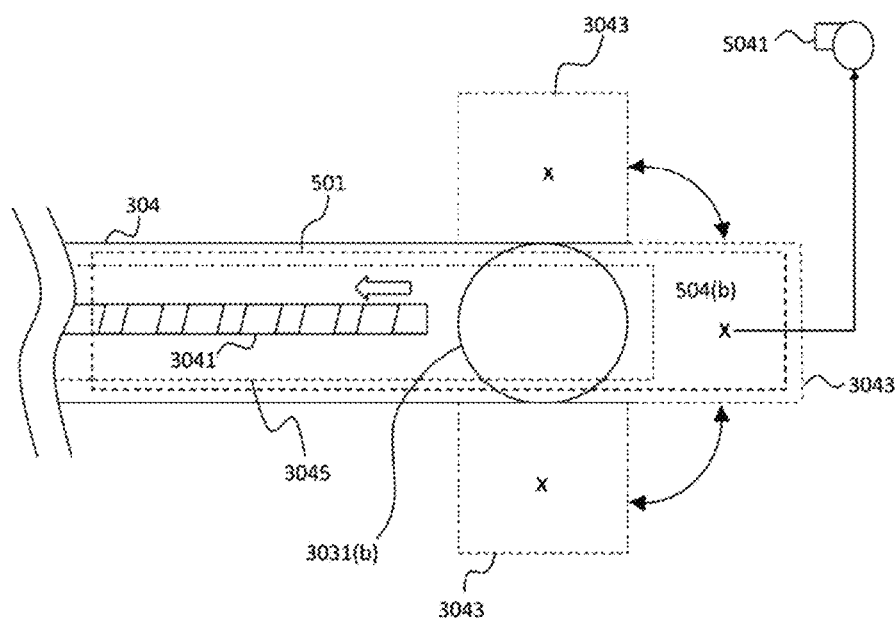
FIG. 6D is a top view of FIG. 6C.

Reference is now made to FIG. 6D, which is a top view of FIG. 6C. As shown in FIG. 6D, the non-transporting portion 3043 can be located right ahead of the transporting portion 3045, or to the side. Also, the number of the non-transporting portion 3043 in the pre-reactor vacuum zone 501 is not limited to one. Multiple non-transporting portions 3043 can be included in one pre-reactor vacuum zone 501.

Figure 6E:
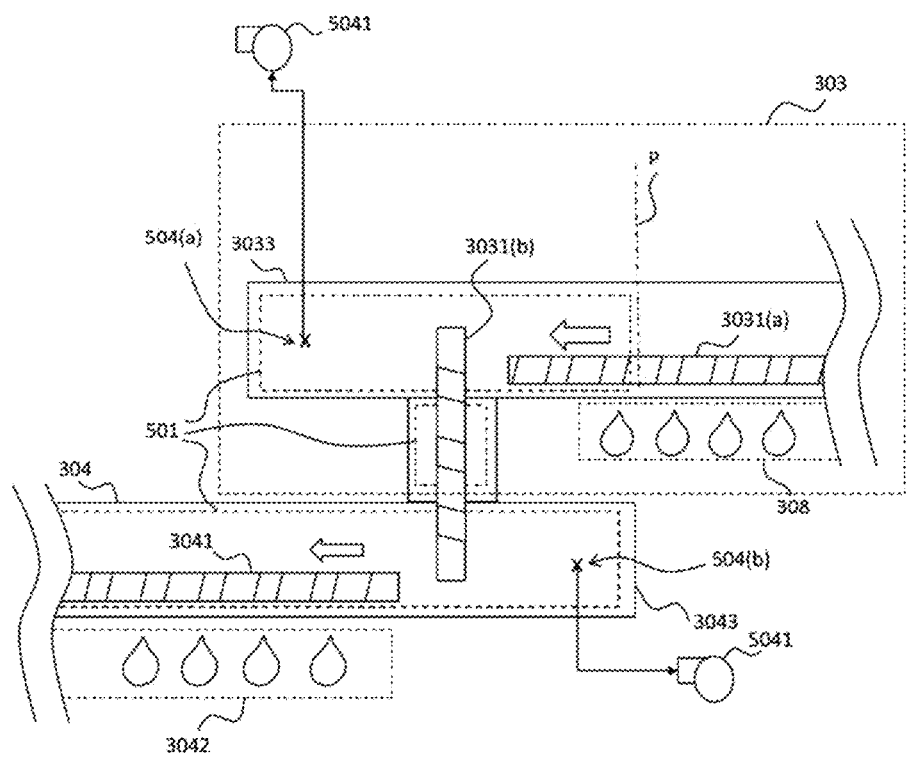
FIG. 6E is a schematic diagram of a pre-reactor vacuum zone according to yet another embodiment of the invention.

Reference is now made to FIG. 6E, which is a schematic diagram of a pre-reactor vacuum zone 501 according to yet another embodiment of the invention. In this embodiment, the feed module 303 comprises a sub-feed material transport device 3031(*a*) and 3031(*b*), both are auger conveyors. The reactor 304 is an auger reactor, and comprises a reactant transport device 3041. As shown in FIG. 6E, the pre-reactor vacuum zone 501 starts at the dash line P, which indicates the location where the feed material starts to become molten, and extends all the way downstream to also include the reactor 304. Similar to the invention concept described in conjunction with FIG. 6A to FIG. 6D, with the aid of the sub-feed material transport device 3031(*a*), 3031(*b*) and 3034, the feed material is forced to travel through the pre-reactor vacuum zone 501 except for chambers 3033 and 3043 where the incoming air is extracted by the vacuum means 5041 through the vacuum points 504(*a*), 504(*b*) or both. In one preferred embodiment, the vacuum points 504 can also serve as a discharge channel for possible presence of the gas product of the thermal cracking reaction, for example escaping from the reactor 304 into the nearby chamber 3043. In such case, the downstream piping of the vacuum means 5041 can be connected to the heat exchanger (e.g. 306 in FIG. 1) for facilitating the collection of the gas product.

It should be noted that, in FIG. 6E the feed material transport device 3031(a) is set to be in a horizontal plane which is above that in which the reactant transport device 3041 lies, which is also not necessary. The feed material transport device 3031(a) can also be set to be in a horizontal plane that is beneath that in which the reactant transport device 3041 lies.

It should also be noted that, as in the embodiment described in conjunction with FIG. 6A, individual transport devices (or say the direction of material flow therein) may form inclined intersection with each other without deviating the invention concept of the transporting portion/non-transporting portion pair. For example, in FIG. 6E, the sub-feed material transport device 3031(a) is parallel to the reactant transport device 3041, or say the feed module 303 is parallel to the reactor 304, but as it will be appreciated by those skilled in the art, they can be inclined to each other as well. Also, in FIG. 6E the sub-feed material transport device 3031(b) is perpendicular to both the sub-feed material transport device 3031(a) and the reactant transport device 3041, which is not necessary either. What lies in the heart of this embodiment is the combination of three features: (a) at least one enclosed space is set to the side of the traveling path of the feed material and connected to that path in a manner that gaseous molecule traveling with the feed material is free to flow into the enclosed space, (b) the feed material is forced to avoid any of these enclosed space, and (c) air molecules are extracted from at least one of these enclosed spaces.

Figure 6F:
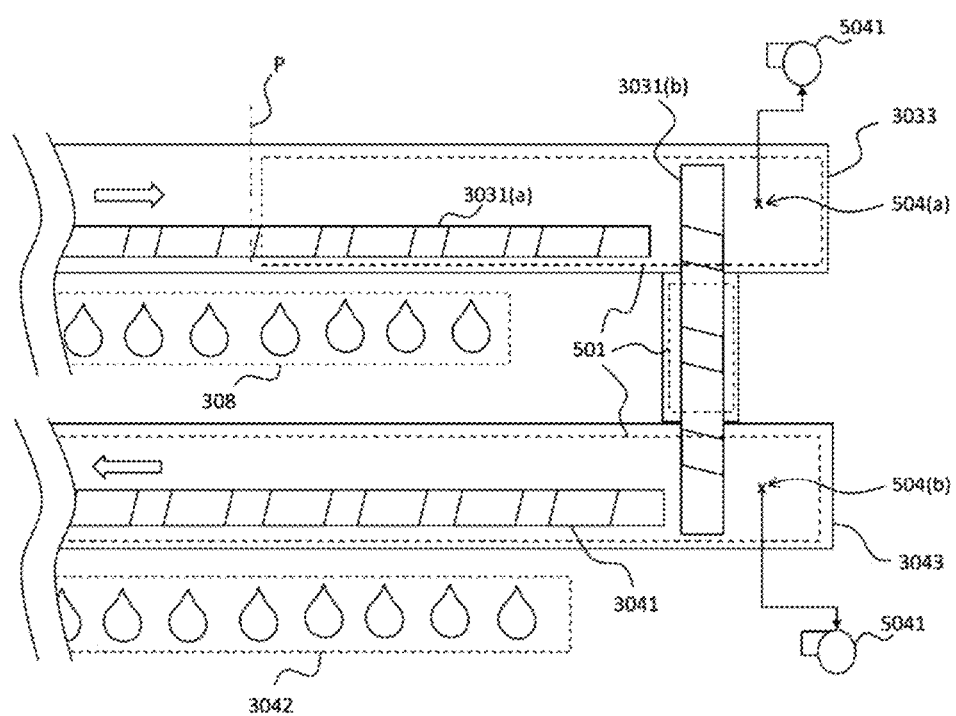
FIG. 6F is a schematic diagram of a pre-reactor vacuum zone according to still another embodiment of the invention.

Reference is now made to FIG. 6F, is a schematic diagram of a pre-reactor vacuum zone 501 according to still another embodiment of the invention. As shown in FIG. 6F, the configuration of this embodiment is the same as that illustrated in FIG. 6E, only that the transporting direction of the sub-feed material transport device 3031(a) is opposite to that of the reactant transport device 3041.

Figure 6G:
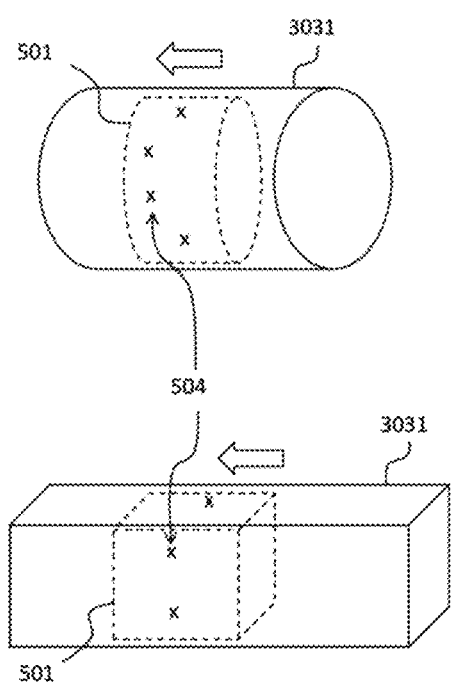
FIG. 6G is a schematic diagram of arrangement of the vacuum points on the feed material transport device according to an embodiment of the invention.
Figure 6H:
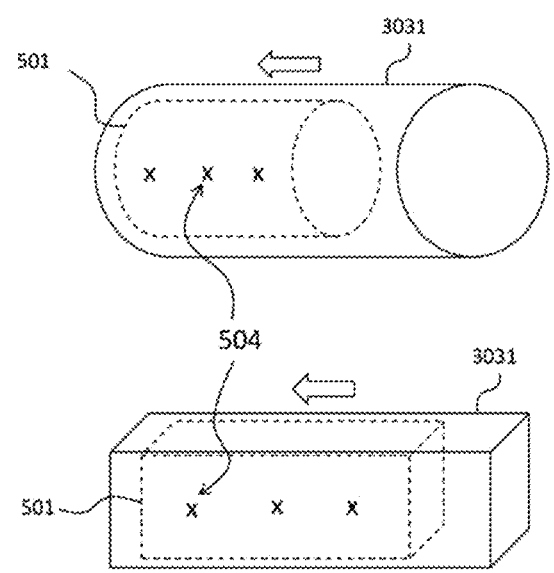
FIG. 6H is a schematic diagram of arrangement of the vacuum points on the feed material transport device according to another embodiment of the invention.

Reference is now made to FIG. 6G and FIG. 6H, wherein FIG. 6G is a schematic diagram of arrangement of the vacuum points 504 on the feed material transport device 3031 according to an embodiment of the invention, and FIG. 6H is a schematic diagram of arrangement of the vacuum points 504 on the feed material transport device 3031 according to another embodiment of the invention. As shown in FIG. 6G and FIG. 6H, the vacuum points 504 may be distributed around the feed material transport device 3031, along the feed material transport device, or combinations thereof. It should be noted that only the casing of the feed material transport device 3031 is shown in FIG. 6G and FIG. 6H, the actual conveyor (conveyor belt, auger conveyor, etc.) is included in the casing but not shown.

Figure 6I:
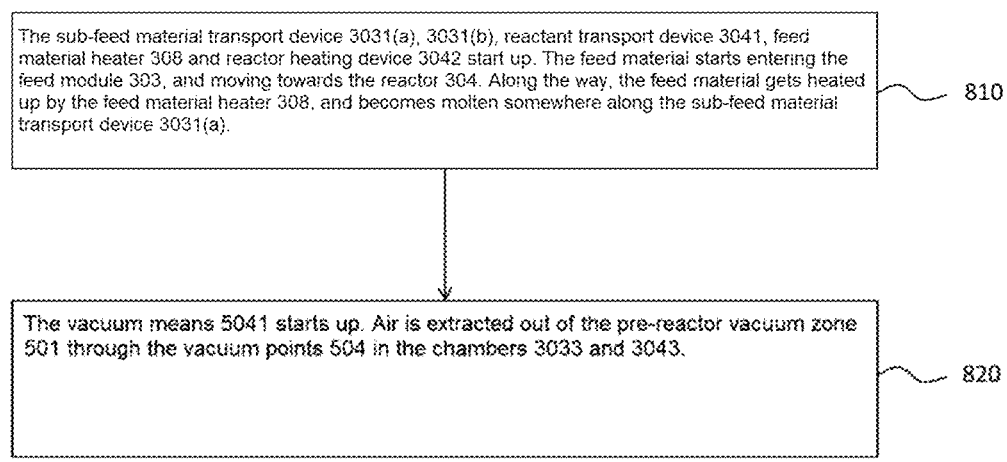
FIG. 6I is a flowchart of the vacuum creation process in the feed material transport device in the pre-reactor vacuum zone illustrated in FIG. 6E to FIG. 6H.

Reference is now made to FIG. 6I, which is a flowchart of the vacuum creation process in the feed material transport device 3031 in the pre-reactor vacuum zone 501 illustrated in FIG. 6E to FIG. 6H. The process includes:

Step 810 The sub-feed material transport device 3031(a), 3031(b), reactant transport device 3041, feed material heater 308 and reactor heating device 3042 start up. The feed material starts entering the feed module 303, and moving towards the reactor 304. Along the way, the feed material gets heated up by the feed material heater 308, and becomes molten somewhere along the sub-feed material transport device 3031(a).

Step 820 The vacuum means 5041 starts up. Air is extracted out of the pre-reactor vacuum zone 501 through the vacuum points 504 in the chambers 3033 and 3043.

Figure 6J:
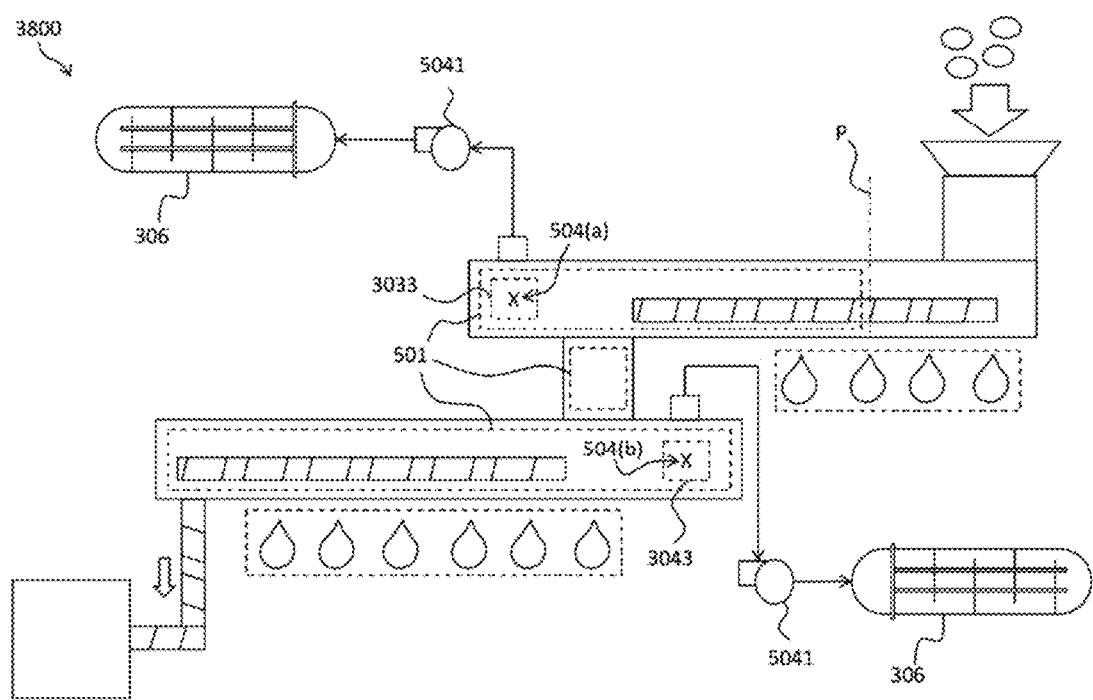
FIG. 6J is a schematic diagram of a thermal cracking system according to an embodiment of the invention.

Reference is now made to FIG. 6J, which is a schematic diagram of a thermal cracking system 3800 according to an embodiment of the invention. As shown in FIG. 6J, the thermal cracking system 3800 is essentially equal to the prior art thermal cracking system 3000 in FIG. 2B except for the introduction of the pre-reactor vacuum zone 501 described in conjunction with FIG. 6A to FIG. 6I. It should be noted that in this embodiment, the vacuum points 504 are provided in both the chamber 3033 i.e. 504(a) and 3043 i.e. 504(b), but as will be appreciated in those skilled in the art, the vacuum points 504 can also be provided in only one of these chambers. In one preferred embodiment, each of the vacuum points 504(a), 504(b) is connected to one or multiple vacuum means 5041. In another preferred embodiment, the downstream piping of the vacuum means 5041 is connected to a heat exchanger 306 described in FIG. 1 for facilitating collection of the gas product of thermal cracking reaction.

Figure 6K:
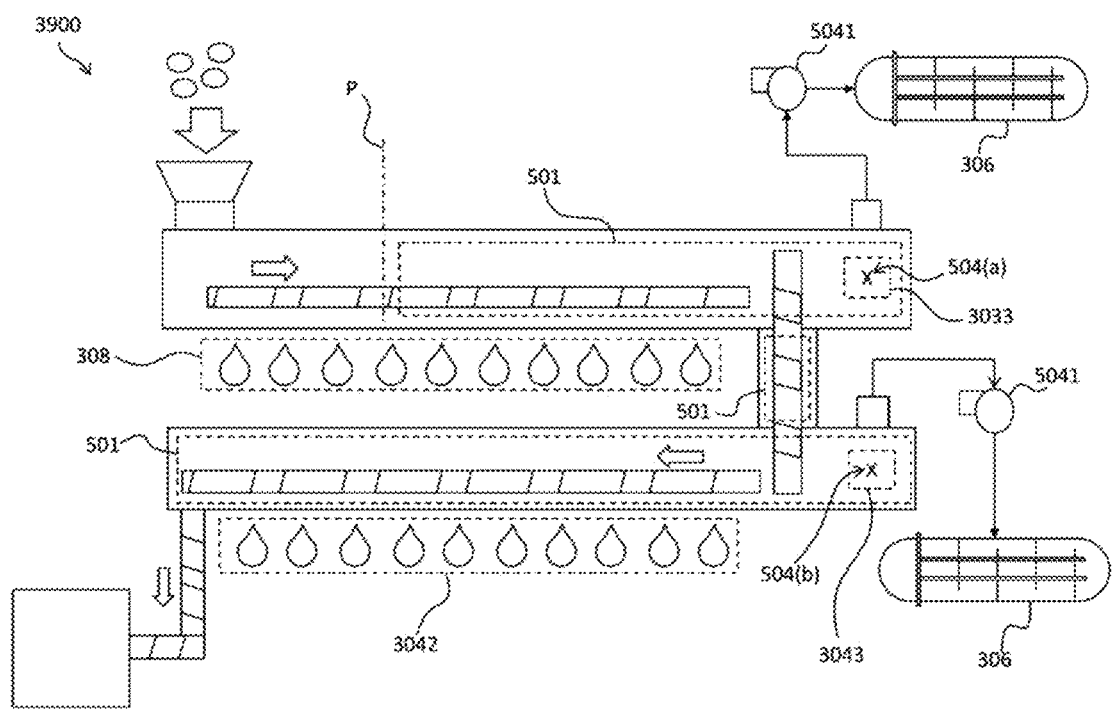
FIG. 6K is a schematic diagram of a thermal cracking system according to another embodiment of the invention.

Reference is now made to FIG. 6K, which is a schematic diagram of a thermal cracking system 3900 according to another embodiment of the invention. As shown in FIG. 6K, the thermal cracking system 3900 is essentially equal to the prior art thermal cracking system 3000 in FIG. 2B except for the introduction of the pre-reactor vacuum zone 501 described in conjunction with FIG. 6A to FIG. 6I. It should be noted that in this embodiment, the vacuum points are provided in both the chamber 3033 i.e. 504(a) and 3043 i.e. 504(b), but as will be appreciated in those skilled in the art, the vacuum points 504 can also be provided in only one of these chambers. In one preferred embodiment, each of the vacuum points 504(a), 504(b) is connected to one or multiple vacuum means 5041. In another preferred embodiment, the downstream piping of the vacuum means 5041 is connected to a heat exchanger 306 described in FIG. 1 for facilitating collection of the gas product of thermal cracking reaction.

Figure 6L:
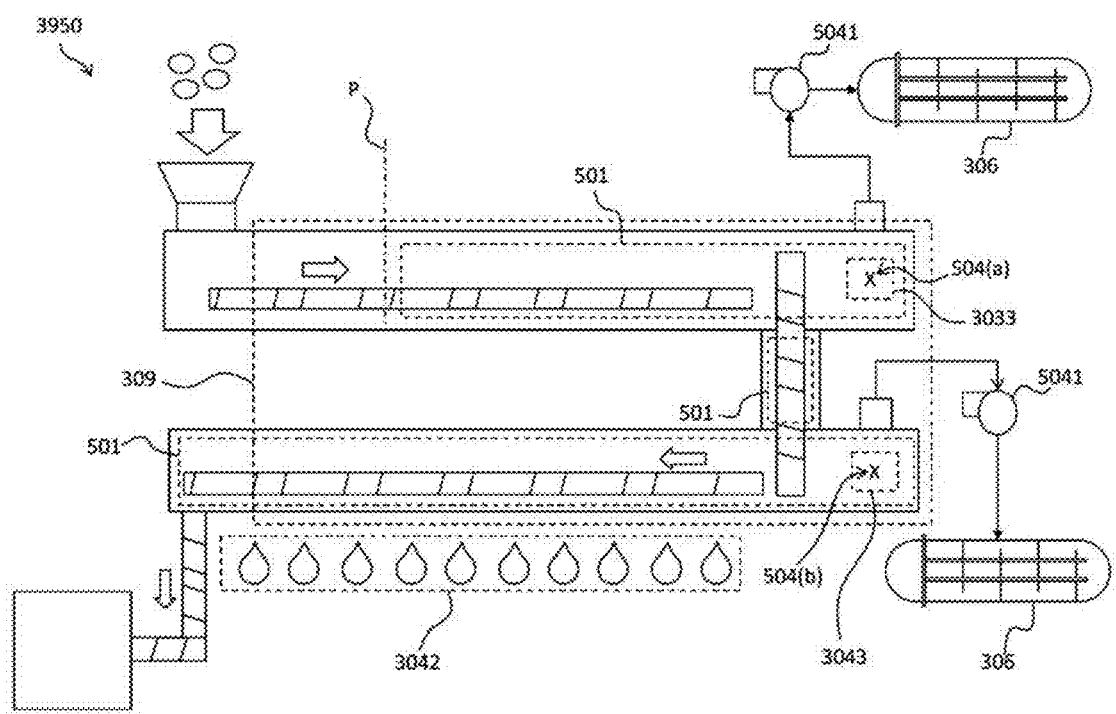
FIG. 6L is a schematic diagram of a thermal cracking system according to yet another embodiment of the invention.

Reference is now made to FIG. 6L, which is a schematic diagram of a thermal cracking system 3950 according to yet another embodiment of the invention. As shown in FIG. 6L, the thermal cracking system 3950 is essentially equal to the prior art thermal cracking system 3000 in FIG. 2D except for the introduction of the pre-reactor vacuum zone 501 described in conjunction with FIG. 6A to FIG. 6I. It should be noted that in this embodiment, the vacuum points 504 are provided in both the chamber 3033 i.e. 504(a) and 3043 i.e. 504(b), but as will be appreciated in those skilled in the art, the vacuum points 504 can also be provided in only one of these chambers. In one preferred embodiment, each of the vacuum points 504(a), 504(b) is connected to one or multiple vacuum means 5041. In another preferred embodiment, the downstream piping of the vacuum means 5041 is connected to a heat exchanger 306 described in FIG. 1 for facilitating collection of the gas product of thermal cracking reaction.

One of the concepts presented by the invention is using the material being transported itself as a barrier to stop the air flow towards the reactor. This can be used in the discharge system as well. This is based on one of the inventor's discoveries that the solid product of thermal cracking reaction often is in the form of powder or small particles, and that it usually gets damp quickly after it leaves the reactor as the gas products traveling along with it gets condensed. As a result, once accumulated in an environment where the temperature is lower than the boiling points of the gas product, enough solid product can form a cake-like plug in the material passage that is capable of serving as a barrier for gas entry. For example, diesel-like hydrocarbons have a boiling temperature typically ranges between 200° C. (392° F.) and 350° C. (662° F.).

The inventor has observed that, during the thermal cracking reaction, the pressure inside the reactor drops below the atmospheric pressure from time to time. If the system is to operate in a continuous discharge mode wherein the solid product is discharged continuously to the outside environment during reaction, there is a risk that air from the outside environment may manage to reach the reactor through the discharge passage, causing dangerous explosion to happen. The inventor has also observed that, the hot combustible gas product of the thermal cracking reaction is likely to flow towards the outside environment alongside the solid product being discharged. As a result, there is a risk that the combustible gas product may manage to reach the outside environment through the discharge passage, causing dangerous explosion to happen. The inventor has further observed that, what is worse is that both situations described above could happen the same time, leading to a risk that the air from the outside environment and the combustible gas from the reactor may meet halfway in the discharge passage and cause dangerous explosion to happen. Based on these observations, thermal cracking systems embodying the principles of the invention direct the solid product to accumulate and fill up the discharge passage, thereby preventing the incoming air from advancing towards the reactor and also preventing the outgoing combustible gas from advancing towards the outside environment. As a result, the risk of explosion imposed by adopting continuous discharge is essentially eliminated.

One of the objectives of the invention is to enable continuous discharge. By achieving this, a number of benefits can be achieved with respect to the scale-up of a thermal cracking system, as summarized below.

TABLE 4

| Problems in prior art (batch discharge) | Solutions by the invention |
| --- | --- |
| Low production efficiency High cost | Employing continuous discharge |
| Poor reactor air tightness | Solid product passes a vacuum zone before reaching outside environment; all gaseous molecules are continuously removed from vacuum zone, leaving solid product alone to move on to outside environment. |

Figure 7A:
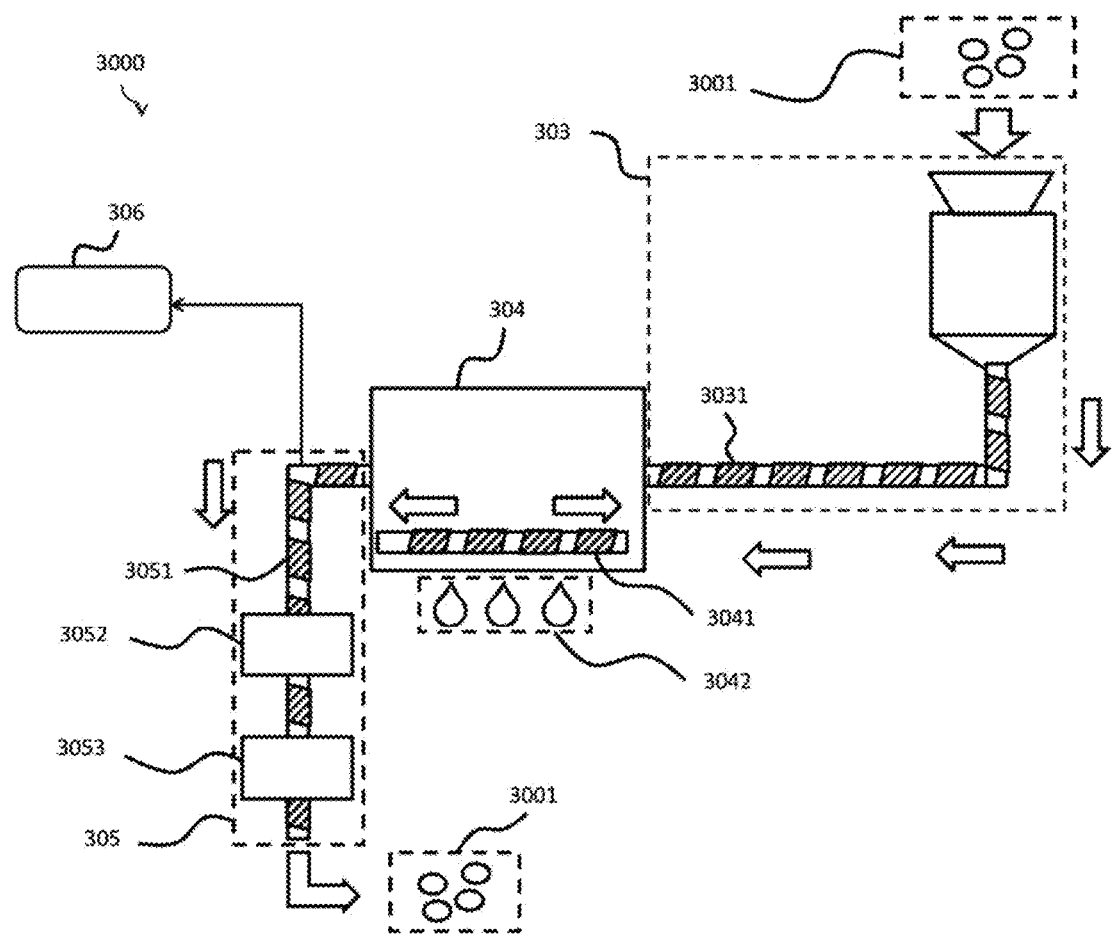
FIG. 7A is a schematic diagram of a prior art thermal cracking system with a rotary kiln reactor.
Figure 7B:
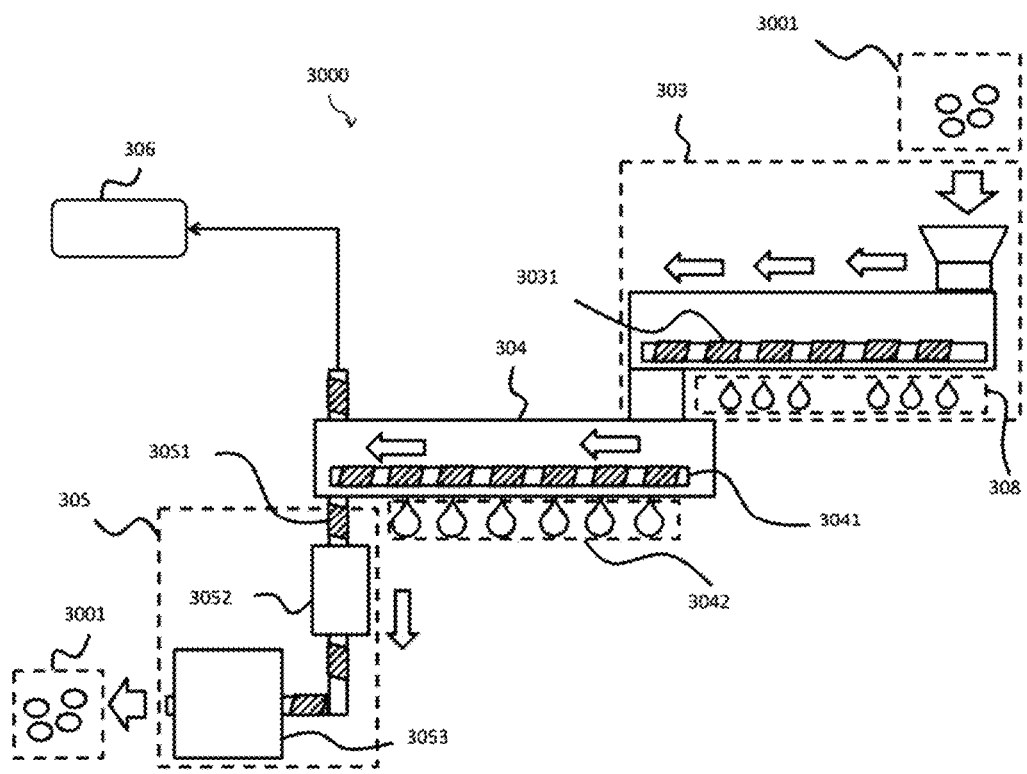
FIG. 7B is a schematic diagram of a prior art thermal cracking system with an auger reactor.

A thermal cracking system generally employs either a rotary kiln reactor or an auger reactor. Reference is now made to FIG. 7A and FIG. 7B, wherein FIG. 7A is a schematic diagram of a prior art thermal cracking system 3000 which is equipped with a rotary kiln reactor 304, and FIG. 7B is a schematic diagram of a prior art thermal cracking system 3000 which is equipped with an auger reactor 304.

As described in conjunction with FIG. 1, the solid product discharge module 305 shown in FIGS. 7A and 7B is used for transporting the solid product of the thermal cracking reaction to outside environment 3001 via a solid product transport device 3031 provided therein. As described in the background of the invention, the solid product transport device 3051 typically moves the solid product from the reactor 304 into a solid product vessel 3053 first. Then, when the product vessel 3053 is full, the solid product transport device 3051 moves the solid product out of the product vessel 3053 and to the outside environment 3001. An optional solid product conditioning device 3052 is sometimes provided between the reactor 304 and the solid product vessel 3053 for preliminary treatment of the solid product, for example a cooling mechanism is provided in the solid product conditioning device 3052 to help the solid product cool down faster.

As shown in FIG. 7A and FIG. 7B, the reactor 304 can further comprise a reactant transport device 3041 and a reactor heating device 3042.

The reactant transport device 3041 is used to move the solid inside the reactor 304 towards a predetermined direction. As shown in FIG. 7A, in the case of a rotary kiln reactor, solid inside the reactor 304 is moved towards the upstream end of material flow i.e. towards feed module 303 during the reaction, and towards the downstream end i.e. towards product discharge module 305 during discharge. On the other hand, as shown in FIG. 7B, in the case of an auger reactor, solid inside the reactor 304 is moved towards the downstream end i.e. towards the solid product discharge module 305 at all time. The reactant transport device 3041 may comprise a conveyor belt, an auger conveyor, gravity, wind, or combinations thereof.

The reactor heating device 3042 is used to provide heat to the reactor 304, raising the temperature of the solid therein to a predetermined range where the thermal cracking reaction of the solid will take place. The reactor heating device 3042 may comprise one or multiple oil burners, gas burners, electrical heaters, or combinations thereof.

As described in conjunction with FIG. 2B, in the case of an auger reactor such as shown in FIG. 7B, the feed module 303 may further comprise a feed material heater 308 for preheating the feed material to a temperature near or inside a predetermined thermal cracking reaction temperature range. The feed material heater 308 may comprise one or multiple oil burners, gas burners, electrical heaters, or combinations thereof. When the feed material heater 308 is present, the feed material transport device 3031 is preferably to be an auger conveyor.

Figure 7C:
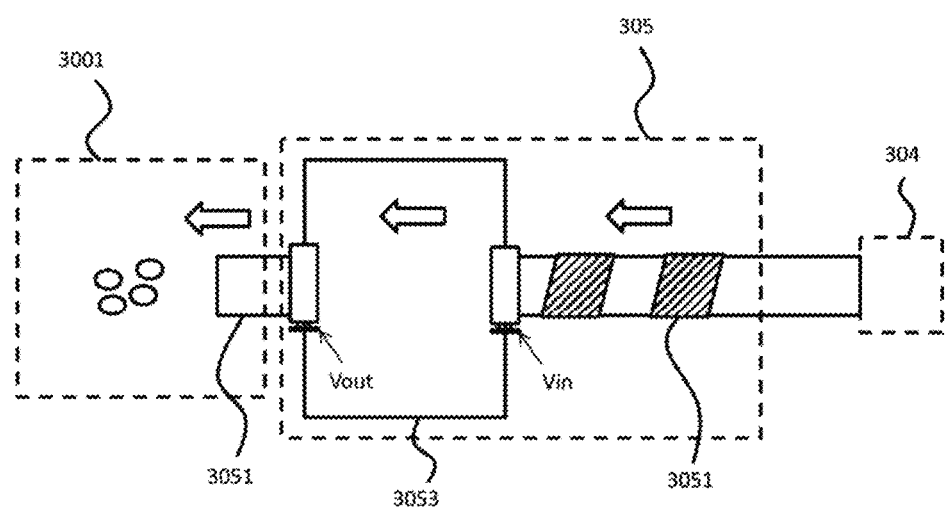
FIG. 7C is a schematic diagram of a prior art solid product vessel.

Reference is now made to FIG. 7C, which is a schematic diagram of a prior art solid product vessel 3053. As shown in FIG. 7C, the solid product is transported by a solid product transport device 3051 to enter the solid product vessel 3053, and then to leave the solid product for the outside environment 3001. The solid product vessel 3053 may further comprise an inlet valve Vin and an outlet valve Vout, wherein the solid product enters the solid product vessel 3053 through the inlet valve Vin, and leaves the solid product vessel 3053 through the outlet valve Vout. The solid product vessel 3053 is typically operated in batch mode as described in the following. First, the inlet valve Vin opens and the outlet valve Vout closes. The solid product enters the solid product vessel 3053 through the inlet valve Vin with the aid of the solid product transport device 3051, and starts accumulating in the solid product vessel 3051. When the amount of accumulated solid product reaches a predetermined threshold value, the inlet valve Vin closes. A period of time is then waited till the solid product has cooled off (as of having reached a predetermined low temperature). When the cooling-off period comes to an end, the outlet valve Vout opens and the solid product leaves the solid product vessel 3053 and eventually reaches the outside environment 3001 with the aid of solid product transport device 3051. In the case the solid product conditioning device 3052 is provided upstream of the solid product vessel 3053 with a cooling mechanism to help the solid product cool off faster, then the cooling-off period may not be necessary.

In the prior art thermal cracking system, the reaction is frequently stopped to allow the solid product to be moved out of the solid product vessel 3053 and to the outside environment 3001. After the solid product has been removed, the reaction can be resumed. The is especially the case for an auger reactor which does not have much capacity to accommodate a large quantity of feed material in one batch. To reduce this downtime frequency, a large solid product vessel 3053 is often employed.

Figure 7D:
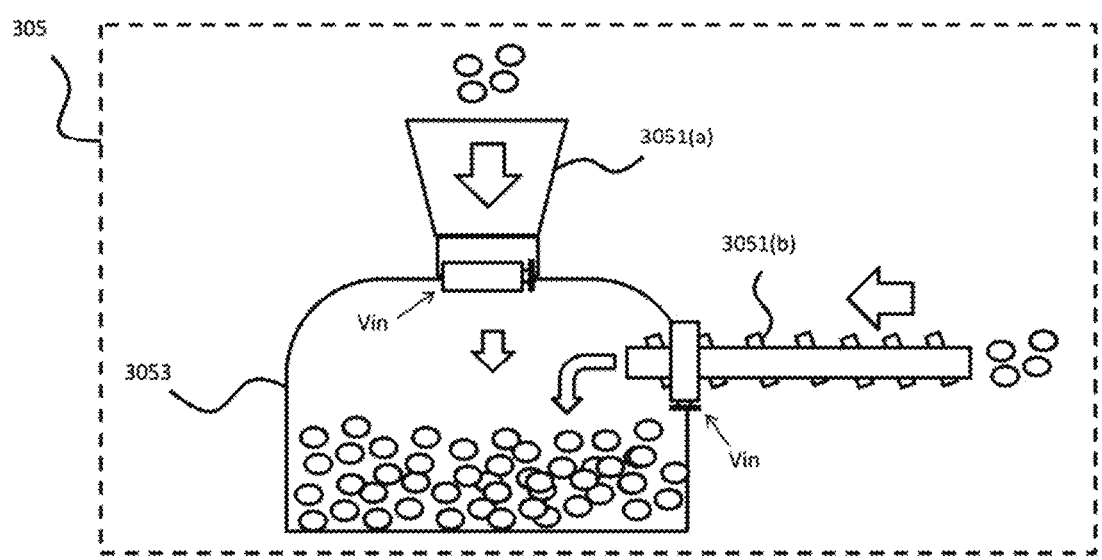
FIG. 7D is a schematic diagram of another prior art solid product vessel.

Reference is now made to FIG. 7D, which is a schematic diagram of another prior art solid product vessel 3053 connected with a solid product transport device 3051 which transports the solid product from upstream material passage into the product vessel 3053. In the prior art, the solid product transport device 3051 is implemented with conveyor belt, auger conveyor, gravity, blower, or combinations thereof. For example, as shown in FIG. 7D, the solid product transport device 3051 comprises two portions 3051(*a*) and 3051(*b*), wherein 3051(*a*) is implemented with gravity and 3051(*b*) is implemented with an auger conveyor.

Figure 7E:
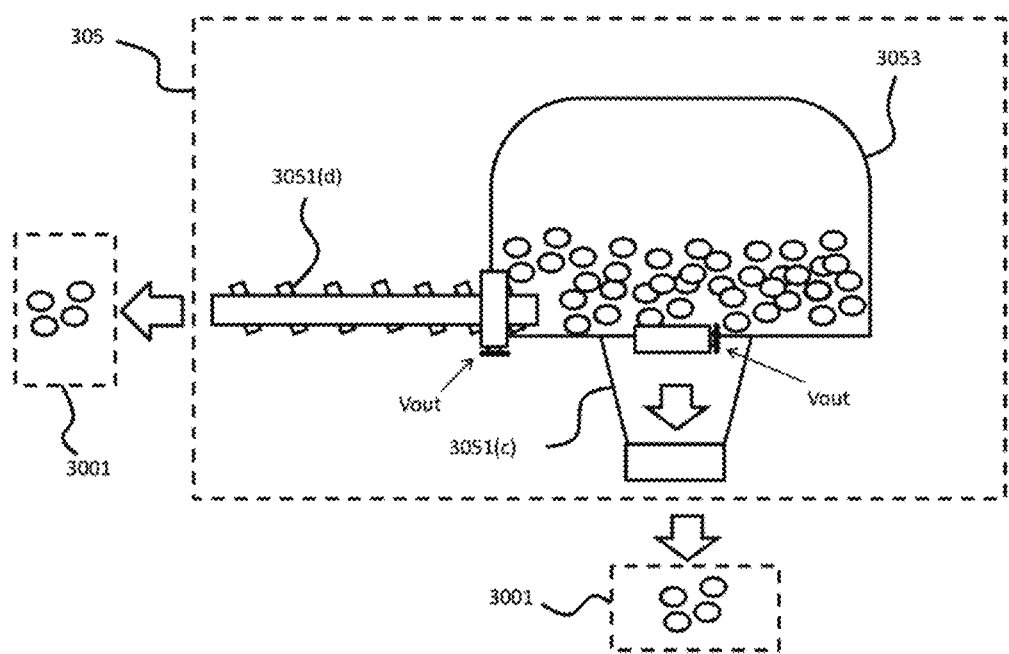
FIG. 7E is a schematic diagram of yet another prior art solid product vessel.

Reference is now made to FIG. 7E, which is a schematic diagram of yet another prior art solid product vessel 3053 connected with a solid product transport device 3051 which transports the solid product form the product vessel 3053 to the outside environment 3001. As shown in FIG. 7E, in this embodiment, the solid product transport device 3051 comprises two portions 3051(*c*) and 3051(*d*), wherein 3051(*c*) is implemented with gravity and 3051(*d*) is implemented with an auger conveyor.

The invention herein provides a thermal cracking system which differs from those illustrated in FIG. 1 and FIG. 7A to FIG. 7E in that it comprises a vacuum zone in the solid product discharge module 305. In other words, the vacuum zone is set downstream of the reactor 304. The solid product of thermal cracking reaction enters the solid product discharge module 305 from the reactor 304, and gets transported by the solid product transport device 3051 towards the outside environment 3001. On the way to the outside environment 3001, the solid product passes the vacuum zone, where the combustible gas product is removed. The solid product alone is left behind to continue to move towards the outside environment 3001. Because the solid product passes this vacuum zone after it leaves the reactor 304, this vacuum zone will be referred to hereinafter as a post-reactor vacuum zone.

The post-reactor vacuum zone comprises at least three components: a solid product inlet, a solid product outlet and one or multiple vacuum points. The solid product enters the post-reactor vacuum zone through the solid product inlet, and leaves the post-reactor vacuum zone through the solid product outlet and into the downstream material passage, continuing its journey towards the outside environment. The vacuum points are connected to one or multiple vacuum means which continuously extracts combustible gas product of the thermal cracking reaction out of the post-reactor vacuum zone. The solid product inlet may be connected to the material passage upstream thereof, or directly to the reactor. The solid product outlet may be connected to the material passage downstream thereof, or directly to the outside environment.

Figure 8A:
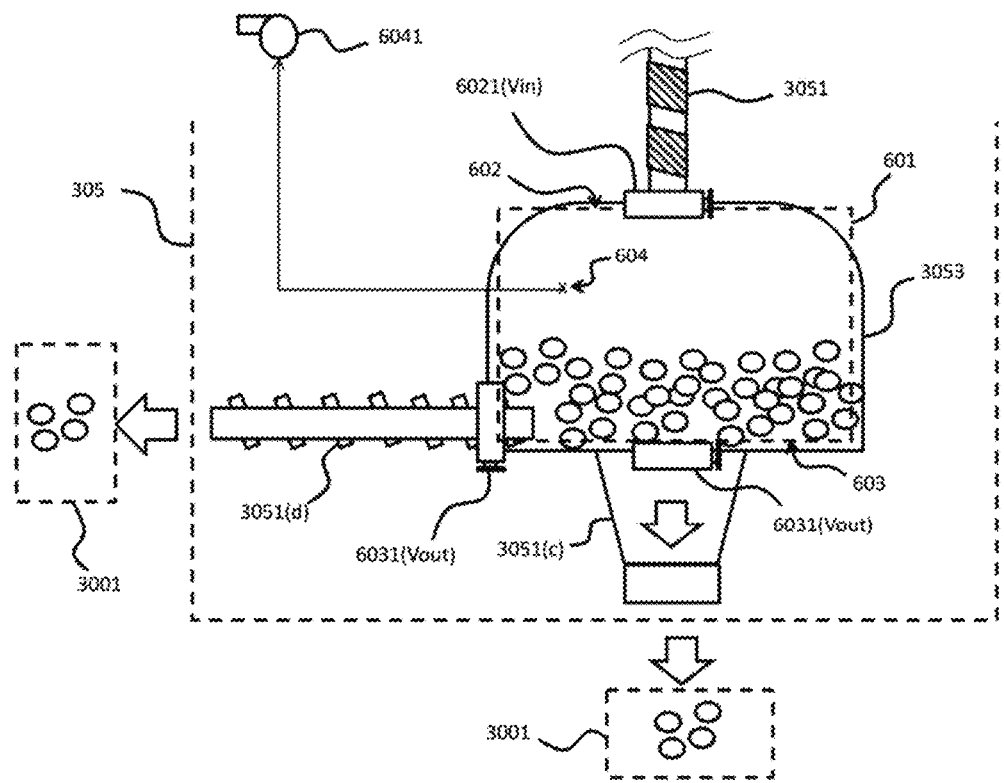
FIG. 8A is a schematic diagram of a post-reactor vacuum zone according to an embodiment of the invention.

Reference is now made to FIG. 8A, which is a schematic diagram of a post-reactor vacuum zone 601 according to an embodiment of the invention. As shown in FIG. 8A, the solid product discharge module 305 comprises a post-reactor vacuum zone 601, which comprises a solid product inlet 602, a solid product outlet 603 and one or multiple vacuum points 604. A switch 6021 is set at the solid product inlet 602 for controlling the on/off of the solid product flow entering the post-reactor vacuum zone 601. The switch 6021 may comprise a valve such as a knife valve, ball valve, rotary valve, etc., or combinations thereof. A switch 6031 is set that the solid product outlet 603 for controlling the on/off and speed of the solid product flow leaving the post-reactor vacuum zone 601. The switch 6031 may comprise a valve such as a knife valve, ball valve, rotary valve, etc., or combinations thereof. The vacuum points 604 are connected to one or multiple vacuum means 6041. The vacuum means 6041 may be a vacuum pump, blower, or combinations thereof. The solid product is transported from the inlet 602 to the outlet 603 by the solid product transport device 3051, which may comprise a conveyor belt, an auger conveyor, or combinations thereof.

In one preferred embodiment, the extraction strength provided by the vacuum means is selected that the extraction rate of gas from the post-reactor vacuum zone 601 is always equal to or greater than the flow rate of air entering the post-reactor vacuum zone 601. For example, as in the embodiment described in conjunction with FIG. 3A and FIG. 3B, this may be achieved by setting the switch 6021 and the vacuum means 6041 to be in communication: in this embodiment, the speed at which the solid product enters the post-reactor vacuum zone 601 through the switch 6021 is measured by switch 6021. On the other hand, the rate at which gas is extracted from the post-reactor vacuum zone 601 is controlled by the vacuum means 6041. Therefore, as the switch 6021 and the vacuum means 6041 are in communication, the switch 6021 can always feed the vacuum means 6041 with information on estimated flow rate of gas entering the pre-reactor vacuum zone 601, and the vacuum 6041 can always respond to that information and adjusts the strength of air extraction from the pre-reactor vacuum zone 601. It can be seen from FIG. 8A that in this embodiment, the post-reactor vacuum zone 601 essentially overlaps with the solid product vessel 3053. The solid product inlet valve Vin is used as the switch 6021, and the solid product outlet valve Vout is used as the switch 6031.

In this embodiment, the switch 6031 (i.e. the outlet valve Vout) is set at the bottom of the post-reactor vacuum zone 601 (i.e. the solid product vessel 3053). When continuous discharge is to be performed, the switch 6031 closes, so that the solid product that has entered post-reactor vacuum zone 601 is unable to leave the post-reactor vacuum zone 601. Instead, the solid product accumulates at the bottom of post-reactor vacuum zone 601. When the accumulated solid submerges the switch 6031, the gas product coming from the reactor 304 is essentially stranded in the post-reactor vacuum zone 601 as it is unable to flow out of the post-reactor vacuum zone 601 through the switch 6031. At the same time, air from the outside environment 3001 cannot flow into the post-reactor vacuum zone 601 through the switch 6031, either. Meanwhile, the vacuum means 6041 starts up, extracting the stranded gas product out of the post-reactor vacuum zone 601.

Then, the switch 6031 opens to allow the solid product to be transported out of the post-reactor vacuum zone 601 and to the outside environment 3001. The switch 6021 and 6031 are in communication to keep the switch 6031 underneath the surface of the accumulated solid product by ensuring that the speed at which the solid product is entering the post-reactor vacuum zone 601 is equal to or greater than that at which the solid product is leaving the post-reactor vacuum zone 601. For example, as in the embodiment described in conjunction with FIG. 8A, the speed at which the solid product enters the post-reactor vacuum zone 601 through the switch 6021 is measured by switch 6021. On the other hand, the speed at which the solid product leaves the post-reactor vacuum zone 601 through the switch 6031 is controlled by the switch 6031 by adjusting the opening size of the valves employed. Therefore, as the switch 6021 and 6031 are in communication, the switch 6021 can always feed the switch 6031 with information on estimated speed at which the solid product is entering the post-reactor vacuum zone 601, and the switch 6031 can always respond to that information and increase/reduce the speed at which the solid product is leaving the post-reactor vacuum zone 601 by adjusting the opening sized of valves employed.

Reference is now made to FIG. 8B, which is a flowchart illustrating the operation of the post-reactor vacuum zone 601 of FIG. 8A. The process includes:

Step 910 The solid product transport device 3051 starts up, switch 6021 (i.e. inlet valve Vin) opens, the vacuum means 6041 starts up, and switch 6031 (i.e. outlet valve Vout) closes. The solid product starts entering the post-reactor vacuum zone 601 (i.e. th solid product vessel 3053) and towards the switch 6031 with the aid of the solid product transport device 3051. The gas product entering the post-reactor vacuum zone 601 alongside the solid product is extracted out of the post-reactor vacuum zone 601 through the vacuum points 604 by the vacuum means 6041.

Step 920 The solid product continues to enter the post-reactor vacuum zone 601, and starts accumulating inside the post-reactor vacuum zone 601 at the switch 6031. When the amount of accumulated solid product reaches a predetermined threshold value, the switch 6031 opens to allow the solid product to be transported out of the post-reactor vacuum zone 601 and to the outside environment 3001. The switch 6021 and 6031 are in communication to ensure the speed at which the solid product is entering the post-reactor vacuum zone 601 is equal to or greater than that at which the solid product is leaving the post-reactor vacuum zone 601, so that the switch 6031 stays submerged by the accumulated solid product.

Step 930 When discharge of solid product needs to stop, for example due to emergency situation or maintenance downtime, the switch 6021 closes, the solid product transport device 3051 and the vacuum means 6041 remains functioning, and the switch 6031 remains open. The solid product continues to be moved out of the post-reactor vacuum zone 601 till the post-reactor vacuum zone 601 is empty or the root of downtime is resolved.

Compared to the prior art discharge system described in conjunction with FIG. 7C, this embodiment provides solutions to the following existing problems: (a) Capital cost associated with installation of large solid product vessel, (b) Operation cost associated with frequent reaction downtime, and (c) Safety risk associated with accumulated combustible gas in a closed vessel (during the cooling-off period). In this embodiment, the solid product is continuously moved out of the post-reactor vacuum zone 601, therefore a relatively small solid product vessel can be employed and still maintain a very low downtime frequency of the reaction, thereby providing solutions to problem (a) and (b). Moreover, combustible gas is continuously removed from the post-reactor vacuum zone 601, therefore essentially no combustible gas accumulation is taking place inside the post-reactor vacuum zone 601, providing solutions to problem (c).

It should be noted that in FIG. 8A, implementation of the portion of solid product transport device 3051 upstream of the post-reactor vacuum zone 601 can be according to those illustrated in conjunction with FIG. 7D.

Figure 8C:
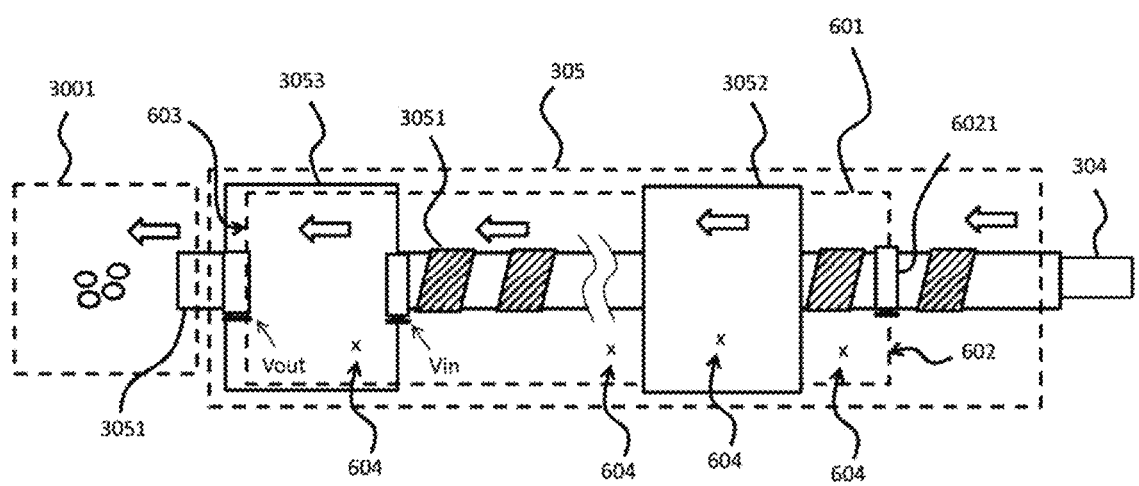
FIG. 8C is a schematic diagram of a post-reactor vacuum zone according to another embodiment of the invention.

Reference is now made to FIG. 8C, which is a schematic diagram of a post-reactor vacuum zone 601 according to another embodiment of the invention. As shown in FIG. 8C, in this embodiment, the post-reactor vacuum zone 601 is set at an alternative location of the solid product discharge module 305. The solid product inlet 602 is set further upstream so that the post-reactor vacuum zone 601 includes the solid product conditioning device 3052. The switch 6021 cannot be implemented by using the inlet valve Vin here. Instead it is implemented with an independent valve. The switch 6031 can still be implemented using the outlet valve Vout. The vacuum points 604 can be set in the solid product vessel 3053, between the solid product vessel 3053 and the solid product conditioning device 3052, in the solid product conditioning device 3052, upstream of the solid product conditioning device 3052, or combinations thereof.

Figure 8D:
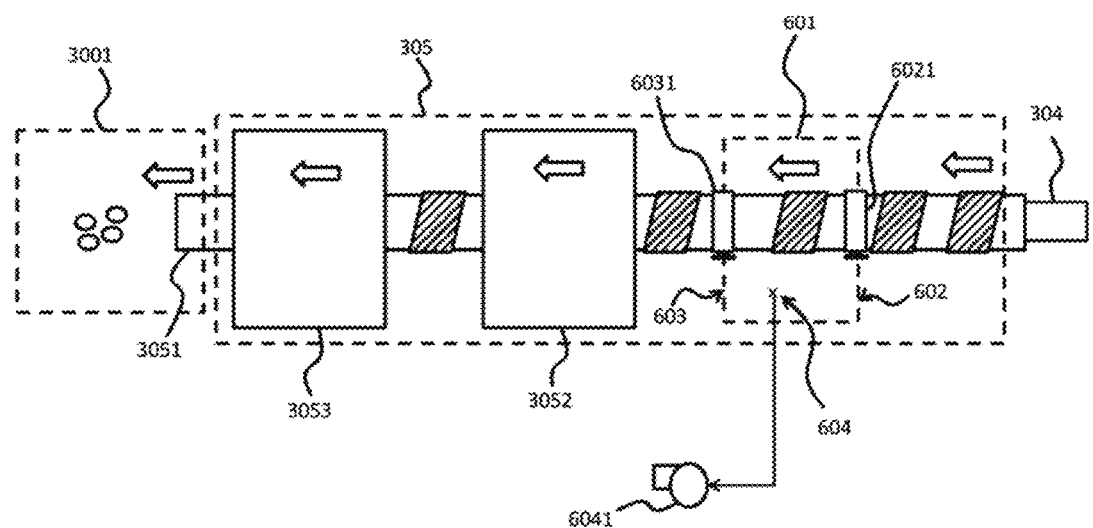
FIG. 8D is a schematic diagram of a post-reactor vacuum zone according to yet another embodiment of the invention.

Reference is now made to FIG. 8D, which is a schematic diagram of a post-reactor vacuum zone 601 according to yet another embodiment of the invention. As shown in FIG. 8D, in this embodiment, the post-reactor vacuum zone 601 is set at a location upstream of the solid product conditioning device 3052, and comprises a solid product inlet 602, a solid product outlet 603 and one or multiple vacuum points 604. A switch 6021 is set at the solid product inlet 602 for controlling the on/off of the solid product flow entering the post-reactor vacuum zone 601. The switch 6021 may comprise a valve such as a knife valve, ball valve, rotary valve, etc., or combinations thereof. A switch 6031 is set that the solid product outlet 603 for controlling the on/off and speed of the solid product flow leaving the post-reactor vacuum zone 601. The switch 6031 may comprise a valve such as a knife valve, ball valve, rotary valve, etc., or combinations thereof. The vacuum points 604 are connected to one or multiple vacuum means 6041. The vacuum means 6041 may be a vacuum pump, blower, or combinations thereof.

In this embodiment, the switch 6031 is set at the bottom of the post-reactor vacuum zone 601 so that it can be submerged by the accumulated solid product inside the post-reactor vacuum 601. Other implementation details of this post-reactor vacuum zone 601 is similar to those described in conjunction with FIG. 8A.

Figure 8E:
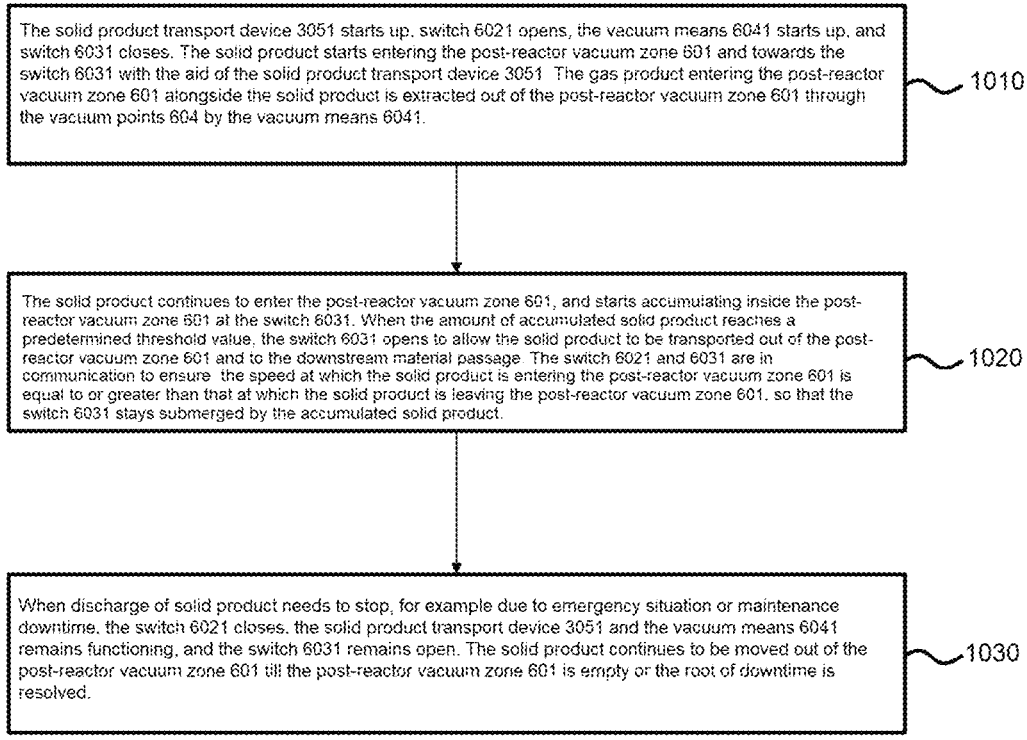
FIG. 8E is a flowchart illustrating operation of the post-reactor vacuum zone of FIG. 8D.

Reference is now made to FIG. 8E, which is a flowchart illustrating the operation of the post-reactor vacuum zone 601 of FIG. 8D. The operation comprises steps as follows:

Step 1010 The solid product transport device 3051 starts up, switch 6021 opens, the vacuum means 6041 starts up, and switch 6031 closes. The solid product starts entering the post-reactor vacuum zone 601 and towards the switch 6031 with the aid of the solid product transport device 3051. The gas product entering the post-reactor vacuum zone 601 alongside the solid product is extracted out of the post-reactor vacuum zone 601 through the vacuum points 604 by the vacuum means 6041.

Step 1020 The solid product continues to enter the post-reactor vacuum zone 601, and starts accumulating inside the post-reactor vacuum zone 601 at the switch 6031. When the amount of accumulated solid product reaches a predetermined threshold value, the switch 6031 opens to allow the solid product to be transported out of the post-reactor vacuum zone 601 and to the downstream material passage. The switch 6021 and 6031 are in communication to ensure the speed at which the solid product is entering the post-reactor vacuum zone 601 is equal to or greater than that at which the solid product is leaving the post-reactor vacuum zone 601, so that the switch 6031 stays submerged by the accumulated solid product.

Step 1030 When discharge of solid product needs to stop, for example due to emergency situation or maintenance downtime, the switch 6021 closes, the solid product transport device 3051 and the vacuum means 6041 remains functioning, and the switch 6031 remains open. The solid product continues to be moved out of the post-reactor vacuum zone 601 till the post-reactor vacuum zone 601 is empty or the root of downtime is resolved.

Compared to the prior art discharge system described in conjunction with FIG. 7C, this embodiment provides solutions to the following existing problems: (a) Capital cost associated with installation of large solid product vessel, (b) Operation cost associated with frequent reaction downtime, and (c) Safety risk associated with accumulated combustible gas in a closed vessel (during the cooling-off period). In this embodiment, the solid product is continuously moved out of the post-reactor vacuum zone 601, therefore a relatively small solid product vessel can be employed and still maintain a very low downtime frequency of the reaction, thereby providing solutions to problem (a) and (b). Moreover, combustible gas is continuously removed from the post-reactor vacuum zone 601, therefore essentially no combustible gas accumulation is taking place inside the post-reactor vacuum zone 601, providing solutions to problem (c).

Figure 8F:
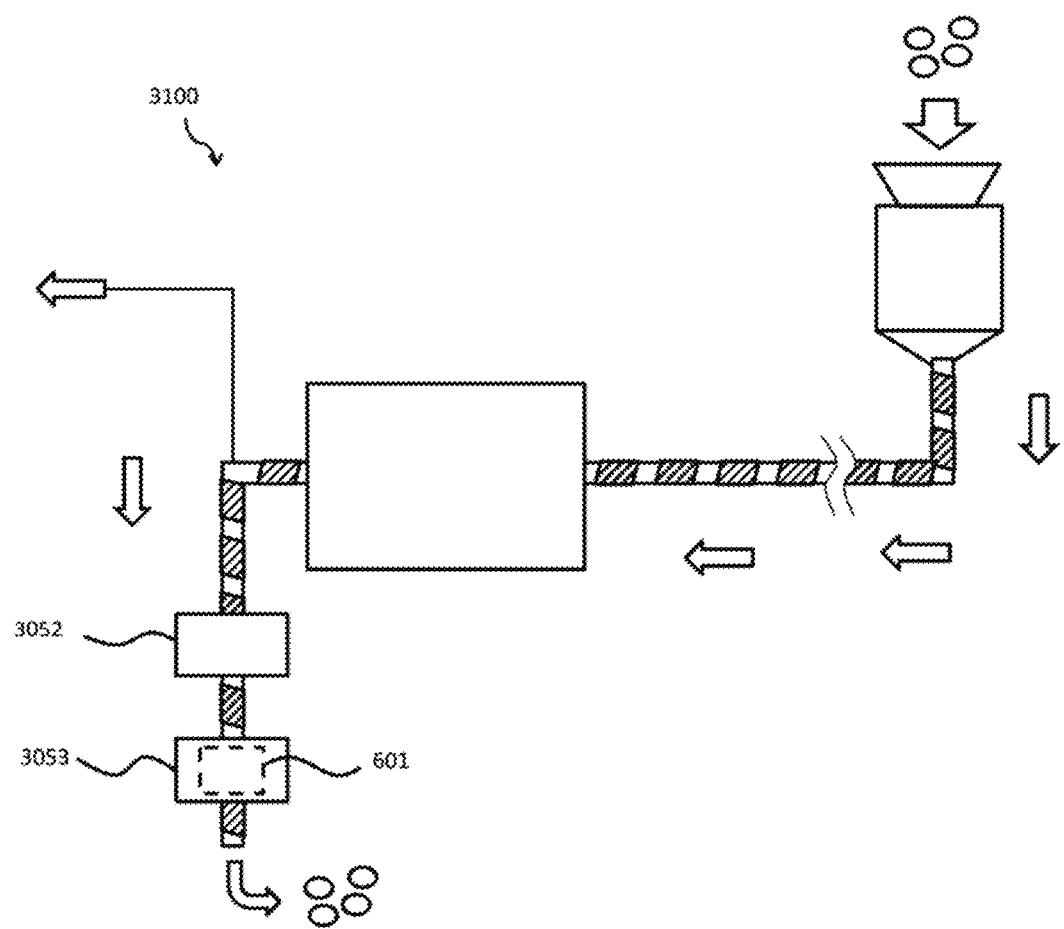
FIG. 8F is a thermal cracking system according to an embodiment of the invention.
Figure 8G:
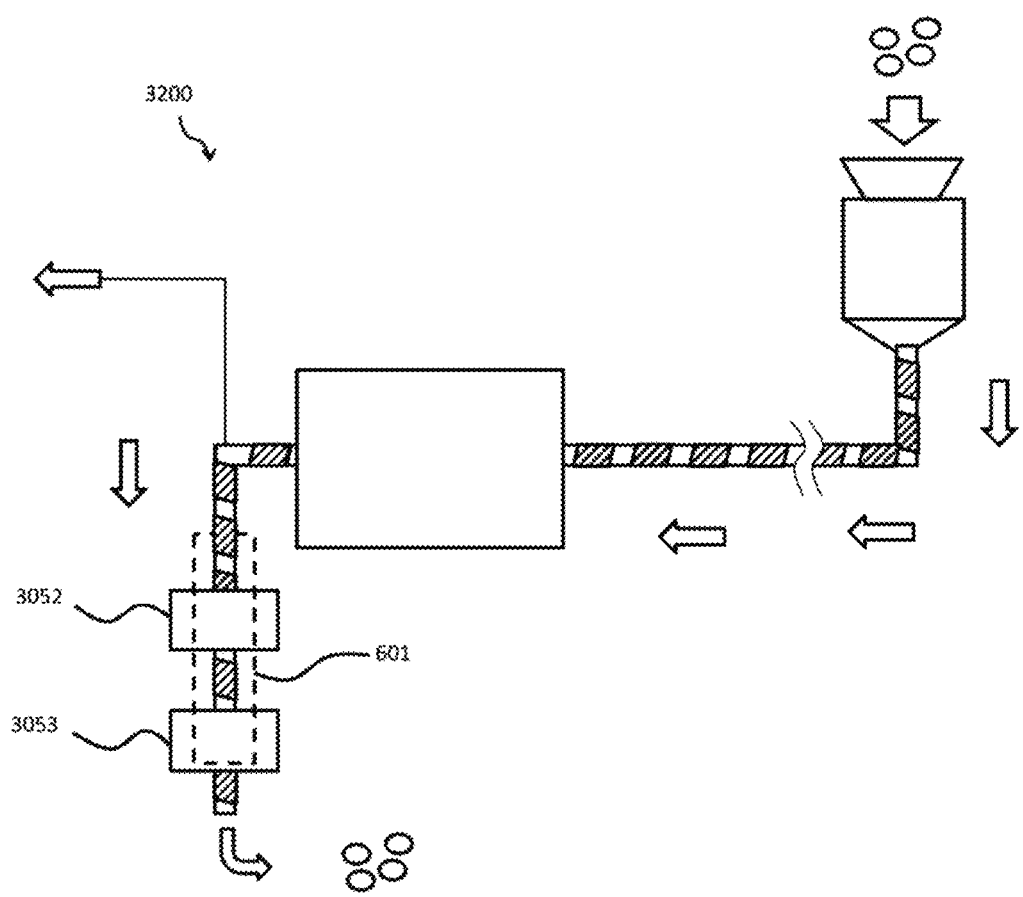
FIG. 8G is a thermal cracking system according to another embodiment of the invention.

Reference is now made to FIG. 8F and FIG. 8G, wherein FIG. 8F is a thermal cracking system 4100 according to an embodiment of the invention, and FIG. 8G is a thermal cracking system 4200 according to another embodiment of the invention. As shown in FIGS. 8F and 8G, the thermal cracking system 4100 and 4200 are essentially equal to the prior art thermal cracking systems 3000 described in conjunction with FIG. 1, FIG. 7A and FIG. 7C to 7E, except for the introduction of the post-reactor vacuum zone 601 described in conjunction with FIG. 8A to FIG. 8C. In one preferred embodiment, the thermal cracking system 4100 and 4200 comprise multiple post-reactor vacuum zones 601, so that they can operate in alternation when maintenance downtime is necessary.

Figure 8H:
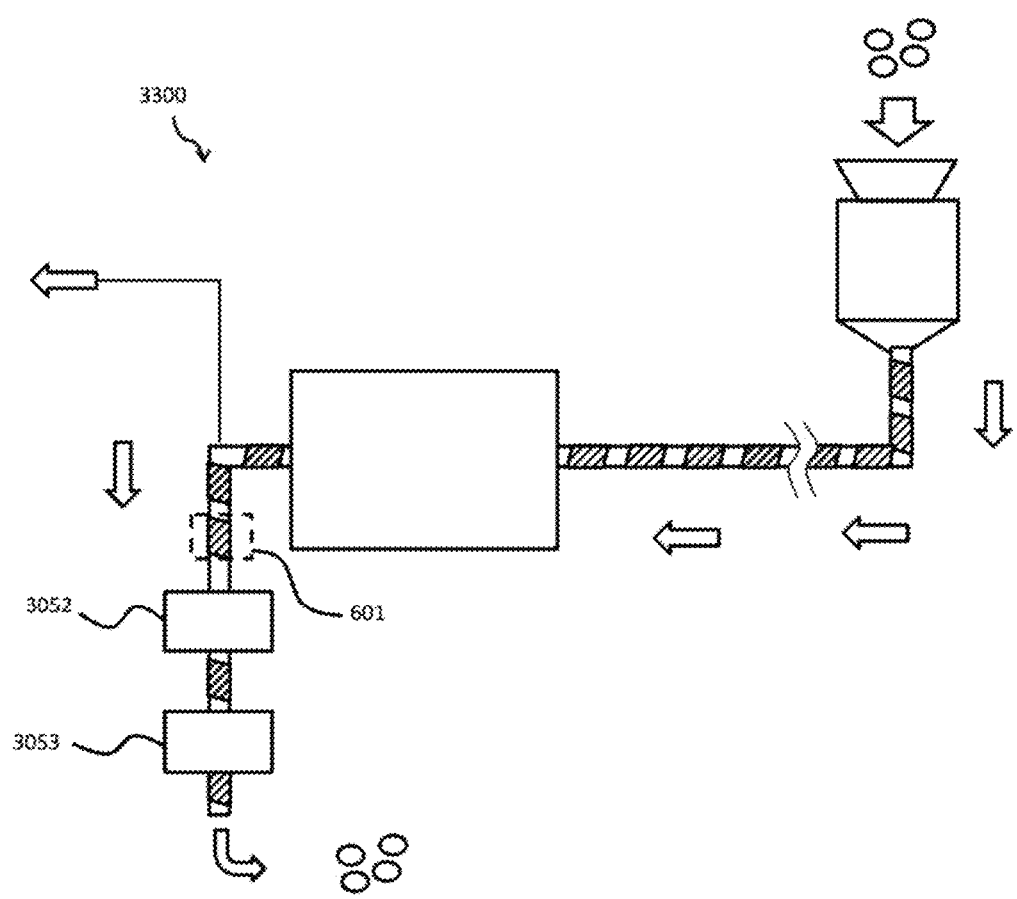
FIG. 8H is a thermal cracking system according to yet another embodiment of the invention.

Reference is now made to FIG. 8H, which is a thermal cracking system 4300 according to yet another embodiment of the invention. As shown in FIG. 8H, the thermal cracking system 4300 is essentially equal to the prior art thermal cracking systems 3000 described in conjunction with FIG. 1, FIG. 7A and FIG. 7C to 7E, except for the introduction of the post-reactor vacuum zone 601 described in conjunction with FIG. 8D and FIG. 8E. In one preferred embodiment, the thermal cracking system 4300 comprises multiple post-reactor vacuum zones 601, so that they can operate in alternation when maintenance downtime is necessary.

Figure 8I:
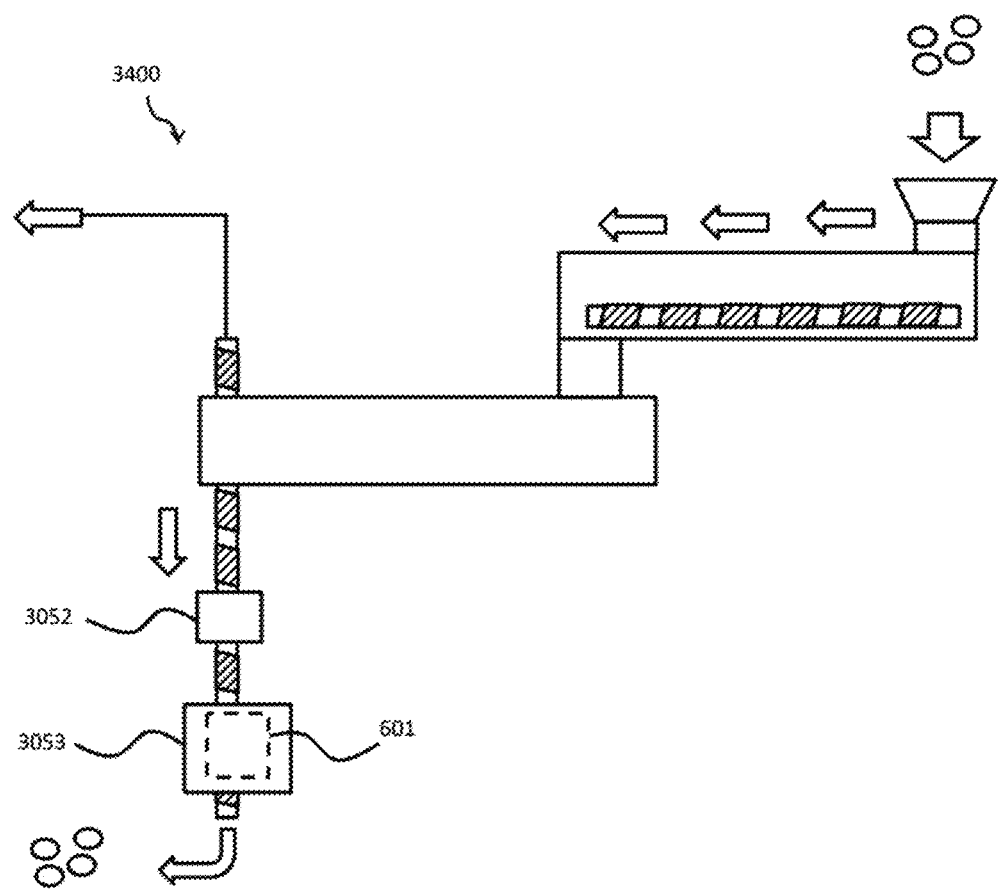
FIG. 8I is a thermal cracking system according to still another embodiment of the invention.
Figure 8J:
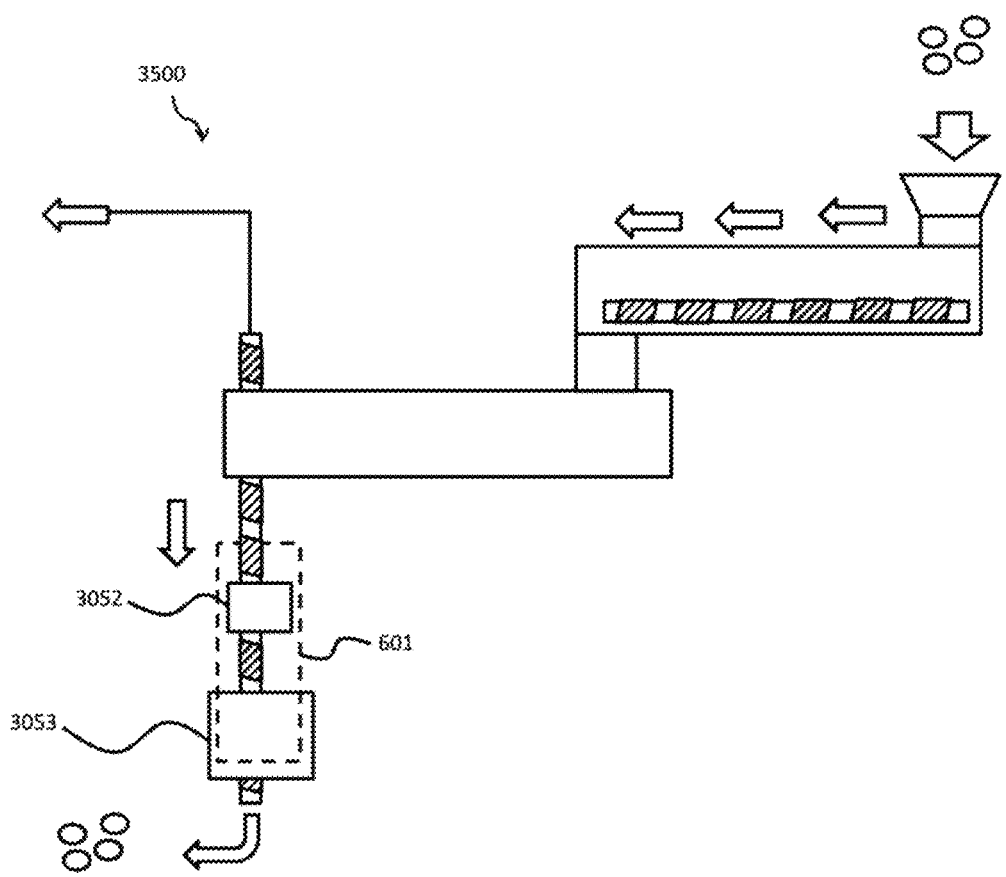
FIG. 8J is a thermal cracking system according to further embodiment of the invention.

Reference is now made to FIG. 8I and FIG. 8J, wherein FIG. 8I is a thermal cracking system 4400 according to still another embodiment of the invention, and FIG. 8J is a thermal cracking system 4500 according to further embodiment of the invention. As shown in FIGS. 8I and 8J, the thermal cracking system 4400 and 4500 are essentially equal to the prior art thermal cracking systems 3000 described in conjunction with FIG. 1 and FIG. 7B to 7E, except for the introduction of the post-reactor vacuum zone 601 described in conjunction with FIG. 8A to FIG. 8C. In one preferred embodiment, the thermal cracking system 4400 and 4500 comprise multiple post-reactor vacuum zones 601, so that they can operate in alternation when maintenance downtime is necessary.

Figure 8K:
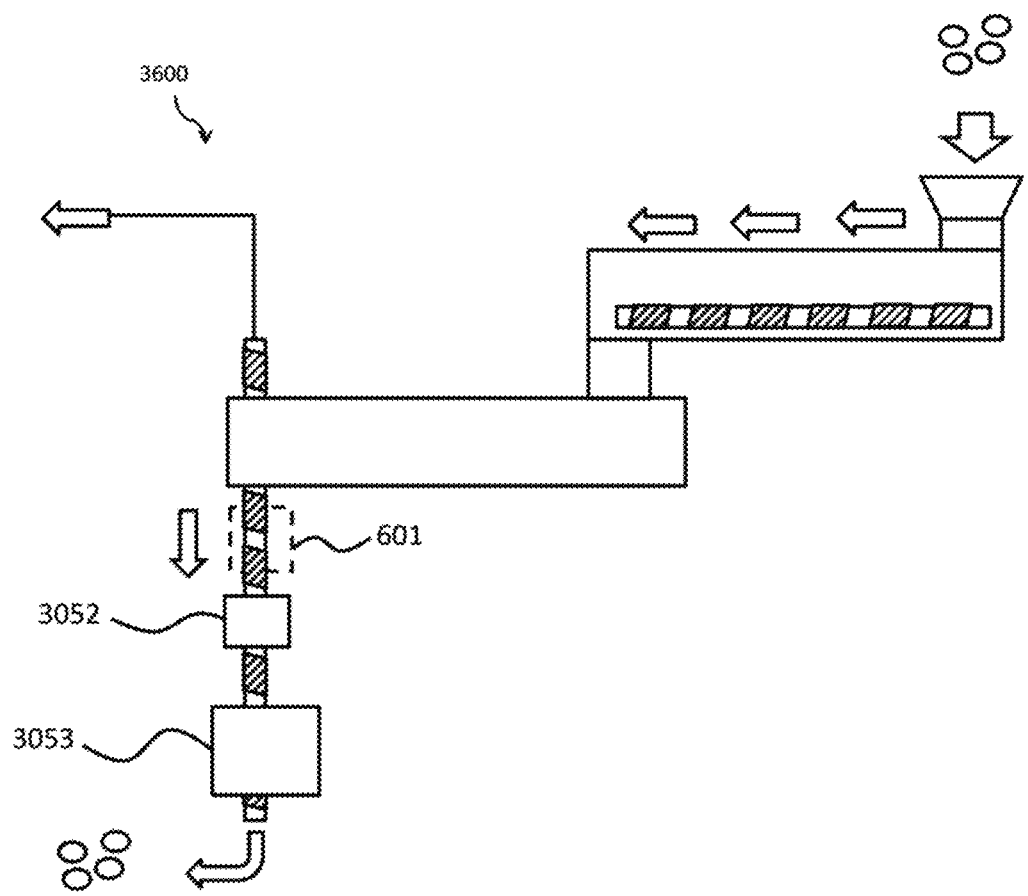
FIG. 8K is a thermal cracking system according to further embodiment of the invention.

Reference is now made to FIG. 8K, which is a thermal cracking system 4600 according to further embodiment of the invention. As shown in FIG. 8K, the thermal cracking system 4600 is essentially equal to the prior art thermal cracking systems described in conjunction with FIG. 1 and FIG. 7B to 7E, except for the introduction of the post-reactor vacuum zone 601 described in conjunction with FIG. 8D and FIG. 8E. In one preferred embodiment, the thermal cracking system 4600 comprises multiple post-reactor vacuum zones 601, so that they can operate in alternation when maintenance downtime is necessary.

Distribution of the vacuum points 604 is designed to achieve maximum effectiveness of gas extraction. The vacuum points 604 can be arranged to locate on the solid product vessel 3053, the solid product transport device 3051, or combinations thereof (as long as the locations are included in the defined post-reactor vacuum zone 601), as described below.

Figure 9A:
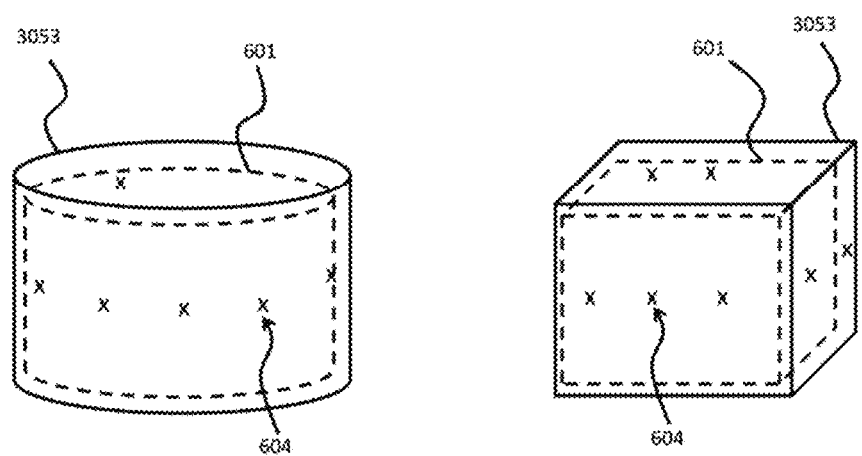
FIG. 9A is a schematic diagram of arrangement of the vacuum points on the solid product vessel of the post-reactor vacuum zone illustrated in FIG. 8A according to an embodiment of the invention.

Reference is now made to FIG. 9A, which is a schematic diagram of arrangement of the vacuum points 604 on the solid product vessel 3053 in FIG. 8A according to an embodiment of the invention. As shown in FIG. 9A, one or multiple vacuum points 604 can be set on the top or sides of the solid product vessel 3053. When set on the top, the vacuum points 604 should be arranged to avoid the immediate vicinity of the connection point of the solid product transport device 3051 and the solid product vessel 3053. When set on the side, the vacuum points 604 should be arranged to be above a predetermined height from the bottom of the solid product vessel 3053, wherein this height is where the surface of the accumulated solid product is going to be at. This is to keep the solid product from being sucked into the vacuum points 604. It should be noted that only the casing of the solid product transport device 3051 is shown in FIG. 9A, the actual conveyor (conveyor belt, auger conveyor, etc.) is included in the casing but not shown.

Figure 9B:
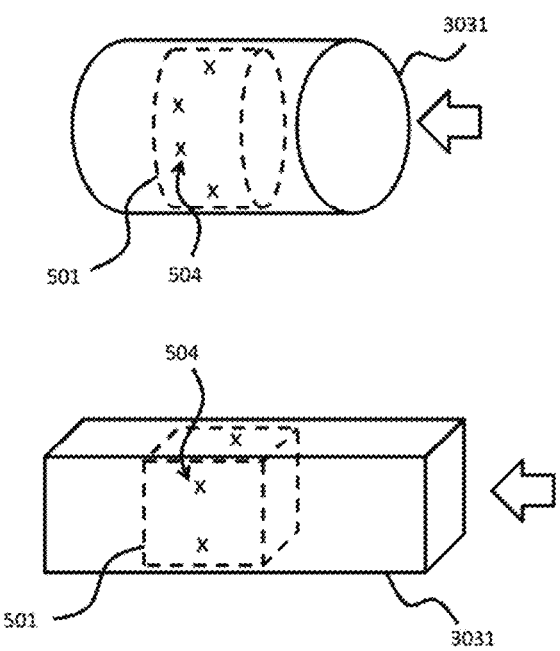
FIG. 9B is a schematic diagram of arrangement of the vacuum points on the solid product transport device of the post-reactor vacuum zone illustrated in FIG. 8C according to an embodiment of the invention.
Figure 9C:
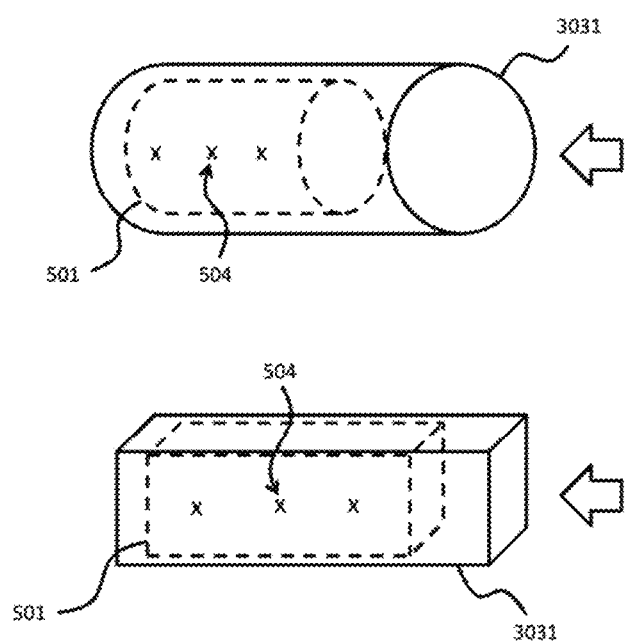
FIG. 9C is a schematic diagram of arrangement of the vacuum points on the solid product transport device of the post-reactor vacuum zone illustrated in FIG. 8D according to an embodiment of the invention.

Reference is now made to FIG. 9B and FIG. 9C, wherein FIG. 9B is a schematic diagram of arrangement of the vacuum points 604 on the solid product transport device 3051 of FIG. 8C according to an embodiment of the invention, and FIG. 9C is a schematic diagram of arrangement of the vacuum points 604 on the solid product transport device 3051 of FIG. 8D according to an embodiment of the invention. As shown in FIG. 9B and FIG. 9C, the vacuum points 604 may be distributed around the solid product transport device 3051, along the solid product transport device 3051, or combinations thereof. It should be noted that only the casing of the solid product transport device 3051 is shown in FIG. 9B and FIG. 9C, the actual conveyor (conveyor belt, auger conveyor, etc.) is included in the casing but not shown.

The arrangement of the vacuum points 604 illustrated in FIG. 9A to 9C can be used to implement the embodiments of the post-reactor vacuum zone 601 described in conjunction with FIG. 8A to 8K.

The concepts of the invention included in the embodiments described in conjunction with FIG. 7A to FIG. 9C can be summarized as follows. A thermal cracking system is provided, which comprises a reactor and a solid product discharge module for transporting the solid product of the thermal cracking reaction to the outside environment. One end of the solid product discharge module is connected with the reactor. The other end of the solid product discharge module comprises a first opening interfacing with the outside environment. When the solid product is transported to the outside environment, the opening size of the first opening is selected such that the speed at which the solid product is entering the solid product discharge module form the reactor is equal to or greater than that at which the solid product is leaving the solid product discharge module, through the first opening, and into the outside environment.

In some variants of the above embodiment, the opening size of the first opening is adjustable.

In some variants of the above embodiments, the first opening is set at the bottom of the solid product discharge module.

In some variants of the above embodiments, one or multiple holes are set on the solid product discharge module, wherein these holes are connected to one or multiple vacuum means for extracting gaseous molecules from the solid product discharge module.

In some variants of the above embodiments, the holes can be distributed around the solid product discharge module, along the solid product discharge module, or combinations thereof.

In some variants of the above embodiments, at least one of the holes is located outside the immediate vicinity of the connection point of the reactor and the solid product discharge module.

In some variants of the above embodiments, at least one of the holes is located vertically above a predetermined height of accumulated solid product in the solid product discharge module.

In some variants of the above embodiments, the gas extraction rate provided by the vacuum means is equal to or greater than the flow rate of gas entering the solid product module along with the solid product.

In some variants of the above embodiments, a solid product cooling means is provided between the solid product discharge module and the outside environment. The solid product cooling means surrounds a portion of the solid product discharge module where the solid product is set to accumulate.

In some variants of the above embodiments, a solid product cooling means is provided between the reactor and the first opening of the solid product discharge module.

In some variants of the above embodiments, a solid product cooling means is provided which surrounds the first opening of the solid product discharge module.

In some variants of the above embodiments, a solid product cooling means is provided for cooling off the solid product by means of a cooling agent such as water.

In some variants of the above embodiments, the solid product discharge module comprises an auger conveyor set between the reactor and the first opening for transporting the solid product from the reactor to the first opening.

In some variants of the above embodiments, the solid product discharge module comprises an auger conveyor set between the accumulated solid product and the first opening for transporting the accumulated solid product to the first opening. In a first preferred variant, one end of this auger conveyor is directed to the bottom of the accumulated solid product, and the other end is directed to the first opening. In a second preferred variant, this auger conveyor has a casing with at least two openings, wherein at least one of these openings is directed to the bottom of the accumulated solid product, and at least one of these openings is employed to serve as the first opening of the solid product discharge module. In the second preferred embodiment, a solid product cooling means may be optionally provided between these two used openings.

In some variants of the above embodiments, the solid product discharge module comprises an auger conveyor surrounded in a casing, wherein one or multiple holes are set on the casing, wherein the holes are connected to one or multiple vacuum means for extracting gas from the solid product discharge module. In one preferred variant, the holes are distributed around the casing, along the casing or combinations thereof. In another preferred variant, the gas extraction rate provided by the vacuum means is equal to or greater than the flow rate of gas entering the auger conveyor along with the solid product.

In some variants of the above embodiments, a valve is set between the reactor and solid product discharge module for controlling the on/off of the solid product flow into the solid product discharge module from the reactor. For example, when the valve is closed, the solid product is unable to enter the solid product discharge module

What is claimed is:

1. A method for feeding a solid directly from the atmosphere into an environment for a thermal cracking processing, comprising:
    feeding said solid carrying an air from said atmosphere into a feed passage; and
    collecting said air at a first gas extracting portion of said feed passage, wherein said solid is forced to bypass said first gas extracting portion before reaching said environment for said thermal cracking processing;
    wherein said thermal cracking process occurs only inside said environment; and
    wherein said air moves concurrently with said solid to said first gas extracting portion.

2. The method of claim 1, further comprising:
    causing said solid to become molten and then fulfilling said feed passage;
    wherein said air is separated away from said solid as said solid becomes molten.

3. The method of claim 1, further comprising:
    causing said solid to become molten prior to reaching said first gas extracting portion of said feed passage;
    wherein said feed passage is directly open to said atmosphere for receiving said solid.

4. The method of claim 2, further comprising:
    engendering blockage in said feed passage with said molten solid.

5. The method of claim 3, further comprising:
    engendering blockage in said feed passage before said first gas extracting portion of said feed passage with said molten solid.

6. An apparatus for feeding a solid directly from the atmosphere into an environment for processing at a first temperature wherein said solid carries an air from said atmosphere, comprising:
    a feed passage connecting to said atmosphere and said environment, wherein said solid carrying said air is fed into said feed passage continuously from said atmosphere, said feed passage comprises a gas extracting portion for collecting said air, and said feed passage has a second temperature, and said second temperature is lower than said first temperature; and
    transport means for transporting said solid to said environment through said feed passage, wherein said transport means forces said solid to bypass said gas extracting portion of said feed passage;
    wherein said air moves concurrently with said solid to said gas extracting portion.

7. The Apparatus of claim 6, further comprising:
    heating means for providing heat to said feed passage, wherein said solid becomes molten inside said feed passage and fulfills said feed passage, and said air is separated away from said solid as said solid becomes molten.

8. The Apparatus of claim 6, further comprising:
    heating means for providing heat to said feed passage, wherein said solid becomes molten inside said feed passage prior to reaching said gas extracting portion of said feed passage.

9. The Apparatus of claim 6, further comprising:
heating means for providing heat to a portion of said feed passage, wherein said transport means moves said solid in a first direction in said portion of said feed passage, said solid experiences a force in a second direction in said portion of said feed passage, and said first direction is different from said second direction.

10. The Apparatus of claim 6, further comprising:
heating means for providing heat to a portion of said feed passage, wherein said portion of said feed passage is other than horizontal.

11. The Apparatus of claim 6, wherein said feed passage further comprises a first portion and a second portion, said gas extracting portion is located in an immediate vicinity of an intersection between said first portion and said second portion, said gas extracting portion is in direct communication with at least one of said first portion and said second portion, said transport means moves said solid through said first portion and then immediately through said second portion, said solid moving in a first direction at said first portion and in a second direction at said second portion, and said first direction is different from said second direction.

12. The Apparatus of claim 11, wherein said first direction and said second direction are perpendicular to each other or inclined intersected with each other.

13. The Apparatus of claim 11, wherein said first portion or said second portion is heated.

14. The Apparatus of claim 6, wherein said solid is composed of at least plastic or rubber.

15. A thermal cracking system, comprising:
a reactor for a thermal cracking reaction;
a feed passage for receiving a feed material directly from the atmosphere and then feeding said feed material into said reactor; and
transport means for a moving said feed material from said atmosphere to said reactor through said feed passage, wherein said feed material comprises a solid carrying an air from said atmosphere, said transport means forces said solid to bypass a first gas extracting portion of said feed passage, said air is collected by allowing said air to enter said first gas extracting portion;
wherein said solid is composed of at least plastic or rubber, and said solid undergoes said thermal cracking reaction to generate at least one of the following: combustible liquid fuel, combustible gas, and carbon;
wherein said thermal cracking reaction occurs only inside said reactor; and
wherein said air moves concurrently with said solid to said gas extracting portion.

16. The thermal cracking system of claim 15, further comprising:
heating means for providing heat to said feed passage, wherein said solid becomes molten inside said feed passage before reaching said reactor and said air is separated away from said feed material as said solid becomes molten.

17. The thermal cracking system of claim 15, further comprising:
heating means for providing heat to said feed passage, wherein said solid becomes molten inside said feed passage prior to reaching said first gas extracting portion of said feed passage.

18. The thermal cracking system of claim 15, wherein said feed passage comprises a first portion and a second portion, said feed material moves in a first direction at said first portion and in a second direction at said second portion, said first direction is different from said second direction, said transport means moves said solid through said first portion and then immediately through said second portion, said gas extracting portion is in a direct communication with at least one of said first portion and said second portion, and said first gas extracting portion is located in an immediate vicinity of an intersection between said first portion and said second portion.

19. The thermal cracking system of claim 18, wherein said first portion or said second portion is heated.

20. The thermal cracking system of claim 18, wherein said first direction and said second direction are perpendicular to each other or inclined intersected with each other.

* * * * *